United States Patent
Zorgui et al.

(10) Patent No.: US 12,553,999 B2
(45) Date of Patent: Feb. 17, 2026

(54) ARCHITECTURE OPTIONS FOR COOPERATIVE SENSING AND POSITIONING

(71) Applicant: QUALCOMM INCORPORATED, San Diego, CA (US)

(72) Inventors: Marwen Zorgui, San Diego, CA (US); Srinivas Yerramalli, San Diego, CA (US); Rajat Prakash, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 18/040,965

(22) PCT Filed: Sep. 10, 2021

(86) PCT No.: PCT/US2021/049831
§ 371 (c)(1),
(2) Date: Feb. 7, 2023

(87) PCT Pub. No.: WO2022/056242
PCT Pub. Date: Mar. 17, 2022

(65) Prior Publication Data
US 2023/0280454 A1    Sep. 7, 2023

(30) Foreign Application Priority Data
Sep. 11, 2020 (IN) .............................. 202041039409

(51) Int. Cl.
*G01S 13/06* (2006.01)
*G01S 13/87* (2006.01)
*H04W 64/00* (2009.01)

(52) U.S. Cl.
CPC ............ *G01S 13/06* (2013.01); *G01S 13/878* (2013.01); *H04W 64/003* (2013.01)

(58) Field of Classification Search
CPC ............... G01N 15/1429; G01N 15/01; G01N 15/1459; G01N 15/1433; G01N 15/147;
(Continued)

(56) References Cited

U.S. PATENT DOCUMENTS

2019/0258878 A1*   8/2019   Koivisto ............. G06V 10/774
2020/0015304 A1*   1/2020   Ma ........................ H04W 76/15
(Continued)

FOREIGN PATENT DOCUMENTS

WO   WO-2017207042 A1   12/2017
WO   WO-2019012361 A1   1/2019

OTHER PUBLICATIONS

International Search Report and Written Opinion—PCT/US2021/049831—ISA/EPO—Dec. 22, 2021 (207715WO).
(Continued)

*Primary Examiner* — Nimesh Patel
(74) *Attorney, Agent, or Firm* — Holland & Hart LLP

(57) ABSTRACT

Wireless communications network architecture options for cooperative sensing and positioning. A sensing management function (SnMF) may be deployed as a network entity within the core network that supports, manages, analyzes, etc., the sensing output(s) of nodes of a wireless network. The SnMF may obtain radio frequency (RF) signal metrics from wireless nodes of a radio access network (RAN), such as base station(s), user equipment (UE), vehicle-based UE(s), wireless nodes deployed within a factory setting, and the like. The RF signal metrics may correspond to, or otherwise be associated with, reflections of RF signal transmissions off of objects. The SnMF may process the RF signal metrics to identify or otherwise determine the various
(Continued)

properties of the objects. An application layer entity, such as an application function (AF), may also be implemented within the core network that issues sensing queries and receives reports about the sensing procedures from the SnMF.

26 Claims, 22 Drawing Sheets

(58) Field of Classification Search
CPC ........... G01N 2015/1006; G16H 10/40; G16H 40/67; G16B 45/00; G01S 13/06; G01S 13/878; G01S 13/726; G01S 7/006; G01S 7/41; G01S 13/003; G01S 19/42; G01S 19/20; G01S 19/40; G01S 19/22; G01S 19/07; G01S 19/51; G01S 19/53; G01S 5/14; G01S 7/403; G01S 13/50; G01S 13/9004; G01S 13/9023; G01S 13/955; G01S 15/46; G01S 19/41; G01S 7/003; H04W 64/003; H04W 88/14; H04W 40/12; H04W 40/205; H04W 52/242; H01Q 1/288; H01Q 1/125; H01Q 1/241; H01Q 1/24; G11B 7/0903; G11B 7/0909; G11B 20/10; G11B 19/125; G11B 7/1395; G11B 7/1392; G11B 7/1381; H04B 7/18517; H04B 1/06; H04B 17/345; H04B 17/382; H04B 7/0617; H04B 7/026; H04B 7/145; H04B 7/18508; H04B 7/18513; H04B 7/18515; G01B 21/28; G01C 13/00; G01C 13/008; Y02D 30/70; G06T 2207/10032; G06T 2207/10044; G06T 2207/10016; G06T 7/11; G06T 7/62; G06T 7/55
See application file for complete search history.

(56) References Cited

U.S. PATENT DOCUMENTS

| | | | |
|---|---|---|---|
| 2020/0142047 A1* | 5/2020 | Zwirn | G01S 13/003 |
| 2020/0275402 A1* | 8/2020 | Shi | H04W 16/28 |
| 2021/0064898 A1* | 3/2021 | Shiue | G06V 40/166 |

OTHER PUBLICATIONS

Vivo: "Network based Sensing in R18", 3GPP Draft, SP-211051, 3rd Generation Partnership Project (3GPP), Mobile Competence Centre, 650, Route Des Lucioles, F-06921 Sophia-Antipolis Cedex, France, No. 20210908, Sep. 8, 2021 (Sep. 8, 2021), 10 Pages, XP052052500, p. 7-p. 9.

* cited by examiner

ARCHITECTURE OPTIONS FOR COOPERATIVE SENSING AND POSITIONING

CROSS REFERENCE

The present Application is a 371 national stage filing of International PCT Application No. PCT/US2021/049831 by ZORGUI et al. entitled "ARCHITECTURE OPTIONS FOR COOPERATIVE SENSING AND POSITIONING," filed Sep. 10, 2021; and claims priority to International Patent Application No. 202041039409 by ZORGUI et al. entitled "ARCHITECTURE OPTIONS FOR COOPERATIVE SENSING AND POSITIONING," filed Sep. 11, 2020, each of which is assigned to the assignee hereof, and each of which is expressly incorporated by reference in its entirety herein.

FIELD OF TECHNOLOGY

The following relates to wireless communications, including architecture options for cooperative sensing and positioning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support architecture options for cooperative sensing and positioning. Generally, the described techniques provide for implementation within a core network of a wireless communications system of a network entity that supports various aspects of cooperative sensing and positioning. For example, a sensing management function (SnMF) may be deployed as a network entity within the core network that supports, manages, analyzes, etc., the sensing output(s) of the environment. An application layer entity, such as an application function (AF), may also be implemented within the core network that issues sensing queries and receives reports about the sensing procedures from the SnMF. The SnMF (a first network entity of the core network in this example) may obtain radio frequency (RF) signal metrics from wireless nodes of a radio access network (RAN), such as base station(s), user equipment (UE), vehicle-based UE(s), wireless nodes deployed within a factory setting, and the like. The RF signal metrics may correspond to, or otherwise be associated with, reflections of RF signal transmissions off of objects. For example, the wireless node may perform an RF transmission towards the object and the RF signal metrics may correspond to or be associated with RF signals reflected off of the objects. The SnMF may process the RF signal metrics to identify or otherwise determine the various properties of the objects. For example, the properties of the objects that the SnMF determines may include, but are not limited to, the presence of the objects, identification of the objects, the location of the objects, the shape of the objects (e.g., size, length, width, height, etc.), movement of the objects and/or movement of components of the objects, speed, direction, frequency, etc., of such movement, and the like. The SnMF may provide an indication of the properties of the objects to the AF (a second network entity in this example).

In some aspects, the AF may receive or otherwise obtain the properties of the objects from the SnMF based on a query. For example, the AF (the second network entity of the core network in this example) may provide a sensing query to the SnMF for the properties corresponding to objects for which the SnMF has object properties. In response to the sensing query, the AF may obtain the properties of each object. For example, the AF may configure the sensing query to request properties for a particular object, for a set of objects, and/or for any object for which the SnMF has determined such properties. Accordingly, the AF may identify or otherwise determine mapping information for the object(s) based on the properties obtained from the SnMF. For example, the mapping information that the AF determines may include, but are not limited to, an environmental mapping (e.g., a 3D map) including object(s) to provide situational/environmental awareness, various characteristics of the object(s). For example, characteristics of the object(s) may include speed, size, shape, direction of movement, movement history, rate of movement of aspects of the object(s) (e.g., a rate at which various characteristics of the object(s) change), and the like. The AF may, alone and/or in combination with various other network entities of the core network and/or RAN, use the mapping information to provide situational awareness to an application, the core network, and/or the RAN. For example, the mapping information may be utilized within a factory setting to manage aspects of factory automation/operation, may be utilized within a vehicle-based network to improve safety, and the like.

In some aspects, a RAN-based sensing management component (SnMC) may be implemented within the RAN to provide coordination respect to cooperative sensing and positioning. For example, the SnMC may be implemented within a protocol stack of the RAN that is used by the wireless nodes of the RAN to exchange various information. For example, the SnMC may be implemented with the protocol stack of base station(s), UE(s), machine-type communication (MTC) device(s), and the like. Accordingly, the SnMC may correspond to a logical entity established on the wireless node(s) of the RAN that communicates with the SnMF within the core network. Accordingly, the SnMC may receive a sensing query for RF signal metrics from the SnMF. The SnMC may receive or otherwise obtain the RF signal metrics from wireless node(s) of the RAN (e.g., from UE(s), base station(s), and/or any other node within the RAN performing sensing operations) and provide the RF signal metrics to the SnMF. The SnMF may use the RF signal metrics to identify or otherwise determine the properties of the object, which are provided to the AF for use in determining the mapping information.

A method of wireless communication at a first network entity of a core network is described. The method may include obtaining, from one or more wireless nodes of a RAN associated with the core network, RF signal metrics associated with reflection off of an object of RF signal transmissions associated with the RAN. The method may further include determining, based on the RF signal metrics, one or more properties of the object, and providing, to a second network entity of the core network that is different than the first network entity, an indication of the one or more properties of the object.

An apparatus for wireless communication at a first network entity of a core network is described. The apparatus may include a processor, memory coupled with the processor, and instructions stored in the memory. The instructions may be executable by the processor to cause the apparatus to obtain, from one or more wireless nodes of a RAN associated with the core network, RF signal metrics associated with reflection off of an object of RF signal transmissions associated with the RAN. The instructions may be further executable by the processor to cause the apparatus to determine, based on the RF signal metrics, one or more properties of the object, and provide, to a second network entity of the core network that is different than the first network entity, an indication of the one or more properties of the object.

Another apparatus for wireless communication at a first network entity of a core network is described. The apparatus may include means for obtaining, from one or more wireless nodes of a RAN associated with the core network, RF signal metrics associated with reflection off of an object of RF signal transmissions associated with the RAN. The apparatus may also include means for determining, based on the RF signal metrics, one or more properties of the object, and means for providing, to a second network entity of the core network that is different than the first network entity, an indication of the one or more properties of the object.

A non-transitory computer-readable medium storing code for wireless communication at a first network entity of a core network is described. The code may include instructions executable by a processor to obtain, from one or more wireless nodes of a RAN associated with the core network, RF signal metrics associated with reflection off of an object of RF signal transmissions associated with the RAN. The code may further include instructions executable by the processor to determine, based on the RF signal metrics, one or more properties of the object, and provide, to a second network entity of the core network that is different than the first network entity, an indication of the one or more properties of the object.

Some examples of the method, apparatuses, and non-transitory computer-readable medium described herein may further include operations, features, means, or instructions for obtaining, from a location management function (LMF) of the core network, positioning information associated with the one or more wireless nodes, the object, or both, where determining the one or more properties of the object may be based on the positioning information.

In some examples of the method, apparatuses, and non-transitory computer-readable medium described herein, obtaining the positioning information may include operations, features, means, or instructions for obtaining the positioning information via an interface established between first network entity and the LMF.

In some examples of the method, apparatuses, and non-transitory computer-readable medium described herein, the first network entity and the LMF include a combined network entity of the core network.

In some examples of the method, apparatuses, and non-transitory computer-readable medium described herein, the first network entity may include operations, features, means, or instructions for obtaining the RF signal metrics from a SnMC of the RAN.

In some examples of the method, apparatuses, and non-transitory computer-readable medium described herein, the SnMC of the RAN operates separately from a LMF of the core network to determine the one or more properties of the object.

In some examples of the method, apparatuses, and non-transitory computer-readable medium described herein, the SnMC of the RAN includes a combined RAN component that may be combined with a LMF component of the RAN.

Some examples of the method, apparatuses, and non-transitory computer-readable medium described herein may further include operations, features, means, or instructions for providing the indication of the one or more properties of the object to the second network entity via a third network entity of the core network that may be different from the first network entity and the second network entity.

In some examples of the method, apparatuses, and non-transitory computer-readable medium described herein, the third network entity includes an access management function of the core network.

Some examples of the method, apparatuses, and non-transitory computer-readable medium described herein may further include operations, features, means, or instructions for obtaining, from the second network entity of the core network, a sensing query for the one or more properties corresponding to each object of a set of objects, where the indication of the one or more properties may be provided based on the sensing query.

In some examples of the method, apparatuses, and non-transitory computer-readable medium described herein, the first network entity includes a SnMF of the core network that operates to determine the one or more properties of the object separately from a location management function of the core network.

In some examples of the method, apparatuses, and non-transitory computer-readable medium described herein, the first network entity includes a SnMF of the core network and the second network entity includes an application layer entity of the core network.

A method of wireless communication at a first network entity of a core network is described. The method may include providing, to a second network entity of the core network different from the first network entity, a sensing query for one or more properties corresponding to each object of a set of objects. The method may also include obtaining, from the second network entity of the core network and for each object of the set of objects, the one or more properties of the object, and determining, based on the one or more properties, mapping information for the set of objects.

An apparatus for wireless communication at a first network entity of a core network is described. The apparatus may include a processor, memory coupled with the processor, and instructions stored in the memory. The instructions may be executable by the processor to cause the apparatus to provide, to a second network entity of the core network different from the first network entity, a sensing query for one or more properties corresponding to each object of a set of objects. The instructions may further be executable by the processor to cause the apparatus to obtain, from the second network entity of the core network and for each object of the set of objects, the one or more properties of the object, and determine, based on the one or more properties, mapping information for the set of objects.

Another apparatus for wireless communication at a first network entity of a core network is described. The apparatus may include means for providing, to a second network entity of the core network different from the first network entity, a sensing query for one or more properties corresponding to each object of a set of objects. The apparatus may further include means for obtaining, from the second network entity of the core network and for each object of the set of objects, the one or more properties of the object, and means for determining, based on the one or more properties, mapping information for the set of objects.

A non-transitory computer-readable medium storing code for wireless communication at a first network entity of a core network is described. The code may include instructions executable by a processor to provide, to a second network entity of the core network different from the first network entity, a sensing query for one or more properties corresponding to each object of a set of objects. The code may also include instructions executable by the processor to obtain, from the second network entity of the core network and for each object of the set of objects, the one or more properties of the object, and determine, based on the one or more properties, mapping information for the set of objects.

Some examples of the method, apparatuses, and non-transitory computer-readable medium described herein may further include operations, features, means, or instructions for obtaining a mapping request from one or more applications associated with the first network entity, where the sensing query may be provided based on the mapping request.

Some examples of the method, apparatuses, and non-transitory computer-readable medium described herein may further include operations, features, means, or instructions for providing, to a third network entity of the core network, the sensing query for forwarding to the second network entity from the third network entity, and obtaining, from the third network entity of the core network, the one or more properties of the object forwarded from the second network entity.

In some examples of the method, apparatuses, and non-transitory computer-readable medium described herein, the third network entity includes an access management function of the core network.

In some examples of the method, apparatuses, and non-transitory computer-readable medium described herein, the first network entity includes an application layer entity of the core network and the second network entity includes a SnMF of the core network.

A method of wireless communication at a component of a RAN is described. The method may include obtaining, from a network entity of a core network associated with the RAN and for each object of a set of objects, a sensing query for RF signal metrics associated with reflection off of each object of RF signal transmissions associated with the RAN. The method further includes obtaining, from one or more wireless nodes of the RAN, the RF signal metrics, and providing, to the network entity, the RF signal metrics.

An apparatus for wireless communication at a component of a RAN is described. The apparatus may include a processor, memory coupled with the processor, and instructions stored in the memory. The instructions may be executable by the processor to cause the apparatus to obtain, from a network entity of a core network associated with the RAN and for each object of a set of objects, a sensing query for RF signal metrics associated with reflection off of each object of RF signal transmissions associated with the RAN. The instructions may be further executable by the processor to cause the apparatus to obtain, from one or more wireless nodes of the RAN, the RF signal metrics, and provide, to the network entity, the RF signal metrics.

Another apparatus for wireless communication at a component of a RAN is described. The apparatus may include means for obtaining, from a network entity of a core network associated with the RAN and for each object of a set of objects, a sensing query for RF signal metrics associated with reflection off of each object of RF signal transmissions associated with the RAN. The apparatus may include means for obtaining, from one or more wireless nodes of the RAN, the RF signal metrics, and means for providing, to the network entity, the RF signal metrics.

A non-transitory computer-readable medium storing code for wireless communication at a component of a RAN is described. The code may include instructions executable by a processor to obtain, from a network entity of a core network associated with the RAN and for each object of a set of objects, a sensing query for RF signal metrics associated with reflection off of each object of RF signal transmissions associated with the RAN. The code may further include instructions executable by the processor to obtain, from one or more wireless nodes of the RAN, the RF signal metrics, and provide, to the network entity, the RF signal metrics.

Some examples of the method, apparatuses, and non-transitory computer-readable medium described herein may further include operations, features, means, or instructions for providing, to each of the one or more wireless nodes of the RAN, a signal triggering RF signal transmissions, where the RF signal metrics may be obtained based on the signal.

Some examples of the method, apparatuses, and non-transitory computer-readable medium described herein may further include operations, features, means, or instructions for obtaining, from a location management component of the RAN, positioning information associated with the one or more wireless nodes, the object, or both, and providing the positioning information with the RF signal metrics to the network entity.

In some examples of the method, apparatuses, and non-transitory computer-readable medium described herein, the component of the RAN includes a SnMC of the RAN.

In some examples of the method, apparatuses, and non-transitory computer-readable medium described herein, the component of the RAN includes a logical component implemented in wireless nodes of the RAN.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
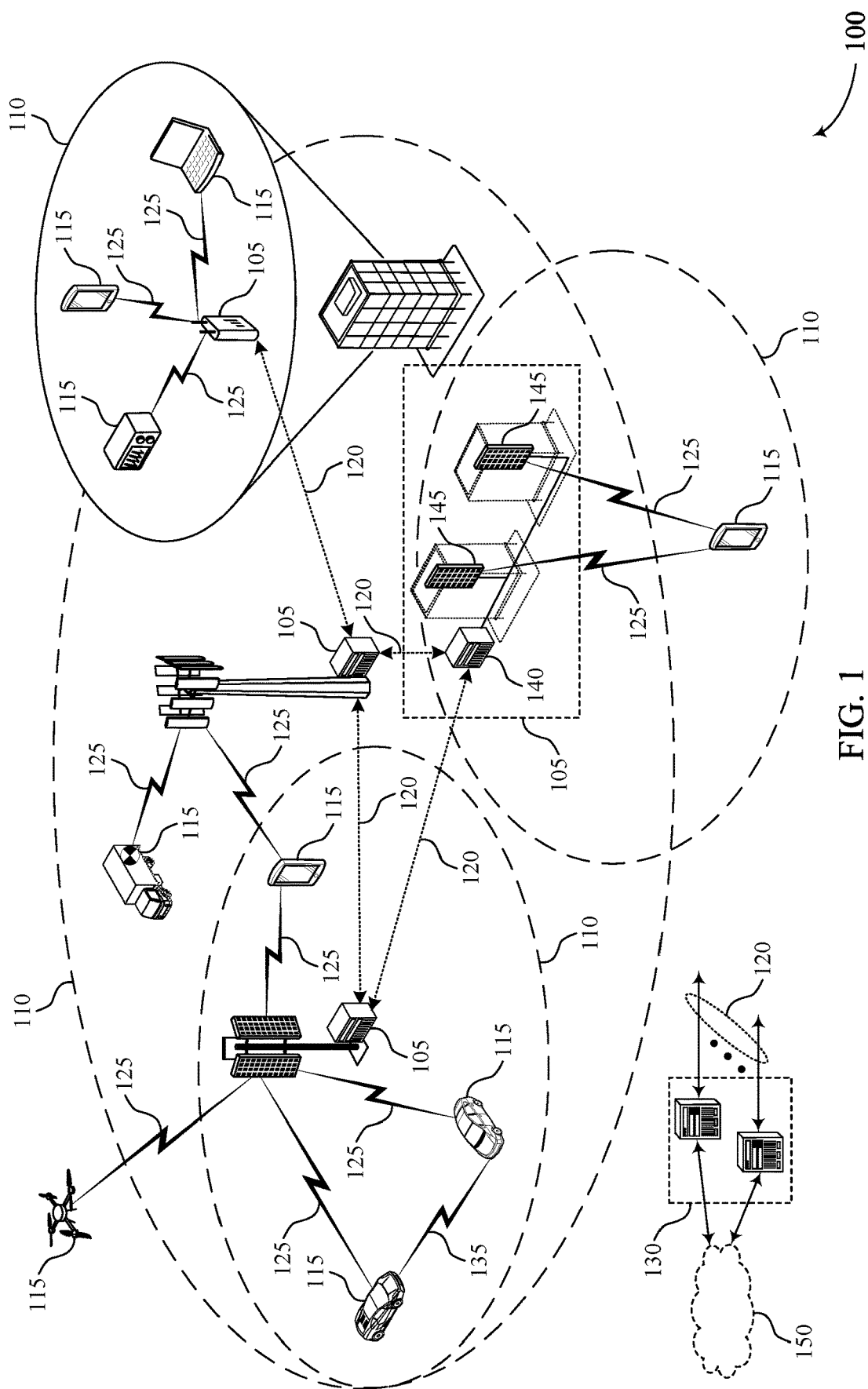
FIG. 1 illustrates an example of a system for wireless communications that supports architecture options for cooperative sensing and positioning in accordance with aspects of the present disclosure.

Wireless communications systems typically support various positioning technologies (e.g., round-trip time (RTT), observed time difference of arrival (OTDOA), uplink time difference of arrival (UTDOA), enhanced cell identification (E-CID), and so forth). These techniques are generally considered active localization techniques, which are based on radio frequency (RF) waves, e.g., each technology requires the UE whose position is being determined to be able to perform an RF transmission. Accordingly, each technology may be dependent upon the capabilities of the user equipment (UE). These technologies, however, do not support passive sensing technologies where the object being sensed may not have RF signal transmission capabilities. That is, wireless communications systems may not support passive sensing where the target(s) or object(s) to be located do not carry an RF device, which may be referred to as RF sensing. RF sensing applications include, but are not limited to, health monitoring (e.g., heartbeat detection/tracking, respiration rate monitoring, etc.), contextual information acquisition (e.g., location detection/tracking, direction finding, range tracking, etc.), automotive radio detection and ranging (RADAR) (e.g., smart cruise control, collision avoidance, etc.), and the like. The lack of support for such passive RF sensing may eliminate the ability to leverage a deployed cellular wireless communications system to support cooperative sensing and positioning.

Aspects of the disclosure are initially described in the context of wireless communications systems. Generally, the described techniques provide for implementation within a core network of a wireless communications system of a network entity that supports various aspects of cooperative sensing and positioning. For example, a sensing management function (SnMF) may be deployed as a network entity within the core network that supports, manages, analyzes, etc., the sensing output(s) of the environment. An application layer entity, such as an application function (AF), may also be implemented within the core network that issues sensing queries and receives reports about the sensing procedures from the SnMF. The SnMF (a first network entity of the core network in this example) may obtain RF signal metrics from wireless nodes of a radio access network (RAN), such as base station(s), UE(s), vehicle-based UE(s), wireless nodes deployed within a factory setting, and the like. The RF signal metrics may correspond to, or otherwise be associated with, reflections of RF signal transmissions off of objects (e.g., passive RF sensing). For example, the wireless node may perform an RF transmission towards an object and the RF signal metrics may correspond to, or otherwise be associated with, the RF signals reflected off of the object. The SnMF may process the RF signal metrics to identify or otherwise determine the various properties of the object. For example, the properties of the object that the SnMF determines may include, but are not limited to, the presence of the object, identification of the object, the location of the object, the shape of the object (e.g., size, length, width, height, etc.), movement of the object and/or movement of a component of the object, speed, direction, frequency, etc., of such movement, and the like. The SnMF provide an indication of the properties of the object to the AF (a second network entity in this example).

In some aspects, the AF may receive or otherwise obtain the properties of the object from the SnMF based on a query. For example, the AF (the first network entity of the core network in this example) may provide a sensing query to the SnMF for the properties corresponding to the object or any other object for which the SnMF has obtained object properties. In response to the sensing query, the AF may obtain the properties of each object. For example, the AF may configure the sensing query to request properties for a particular object, for a set of objects, and/or for any object for which the SnMF has determined such properties. Accordingly, the AF may identify or otherwise determine mapping information for the object(s) based on the properties obtained from the SnMF. For example, the mapping information that the AF determines may include, but are not limited to, an environmental mapping (e.g., a 3D map) including objects object(s) to provide situational/environmental awareness, various characteristics of the object(s). For example, object properties include speed, size, shape, direction of movement, movement history, rate of movement of aspects of the object (e.g., a rate at which various characteristics of the object change), and the like. The AF may, alone and/or in combination with various other network entities of the core network and/or RAN, use the mapping information to provide situational awareness to an application, the core network, and/or the RAN. For example, the mapping information may be utilized within a factory setting to manage aspects of factory automation/operation, may be utilized within a vehicle-based network to improve safety, and the like.

In some aspects, a RAN-based SnMC may be implemented within the RAN to provide coordination respect to cooperative sensing and positioning. For example, the SnMC may be implemented within a protocol stack of the RAN that is used by the wireless nodes of the RAN to exchange various information. For example, the SnMC may be implemented with the protocol stack of base station(s), UE(s), machine-type communication (MTC) device(s), and the like. Accordingly, the SnMC may correspond to a logical entity established on the wireless node(s) of the RAN that communicates with the SnMF within the core network. Accordingly, the SnMC may receive a sensing query for RF signal metrics from the SnMF. The SnMC may receive or otherwise obtain the RF signal metrics from wireless node(s) of the RAN (e.g., from UE(s), base station(s), and/or any other node within the RAN performing sensing operations) and provide the RF signal metrics to the SnMF. The SnMF may use the RF signal metrics to identify or otherwise determine the properties of the object, which are provided to the AF for use in determining the mapping information.

Aspects of the disclosure are further illustrated by and described with reference to apparatus diagrams, system diagrams, and flowcharts that relate to architecture options for cooperative sensing and positioning.

FIG. 1 illustrates an example of a wireless communications system 100 that supports architecture options for cooperative sensing and positioning in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first network entity of core network 130 (e.g., an SnMF in this example) may obtain, from one or more wireless nodes (e.g., a UE 115, base station 105, etc.) of a RAN associated with core network 130, RF signal metrics associated with reflection off of an object of RF signal transmissions associated with the RAN. The first network entity may determine, based at least in part on the RF signal metrics, one or more properties of the object. The first network entity may provide, to a second network entity of core network 130 (e.g., an AF in this example) that is different than the first network entity, an indication of the one or more properties of the object.

A first network entity of core network 130 (e.g., an AF in this example) may provide, to a second network entity of core network 130 (e.g., an SnMF in this example) different from the first network entity, a sensing query for one or more properties corresponding to each object of a plurality of objects. The first network entity may obtain, from the second network entity of core network 130 and for each object of the plurality of objects, the one or more properties of the object. The first network entity may determine, based at least in part on the one or more properties, spatial or mapping information for the plurality of objects.

A component of the RAN (e.g., an SnMC implemented at and/or by a base station 105, UE 115, or any other wireless node within wireless communications system 100) may obtain, from a network entity of core network 130 (e.g., an SnMF in this example) associated with the RAN and for each object of a plurality of objects, a sensing query for RF signal metrics associated with reflection off of each object of RF signal transmissions associated with the RAN. The component may obtain, from one or more wireless nodes of the RAN (e.g., a base station 105, UE 115, and/or any other wireless node within wireless communications system 100), the RF signal metrics. The component may provide, to the network entity, the RF signal metrics.

Figure 2:
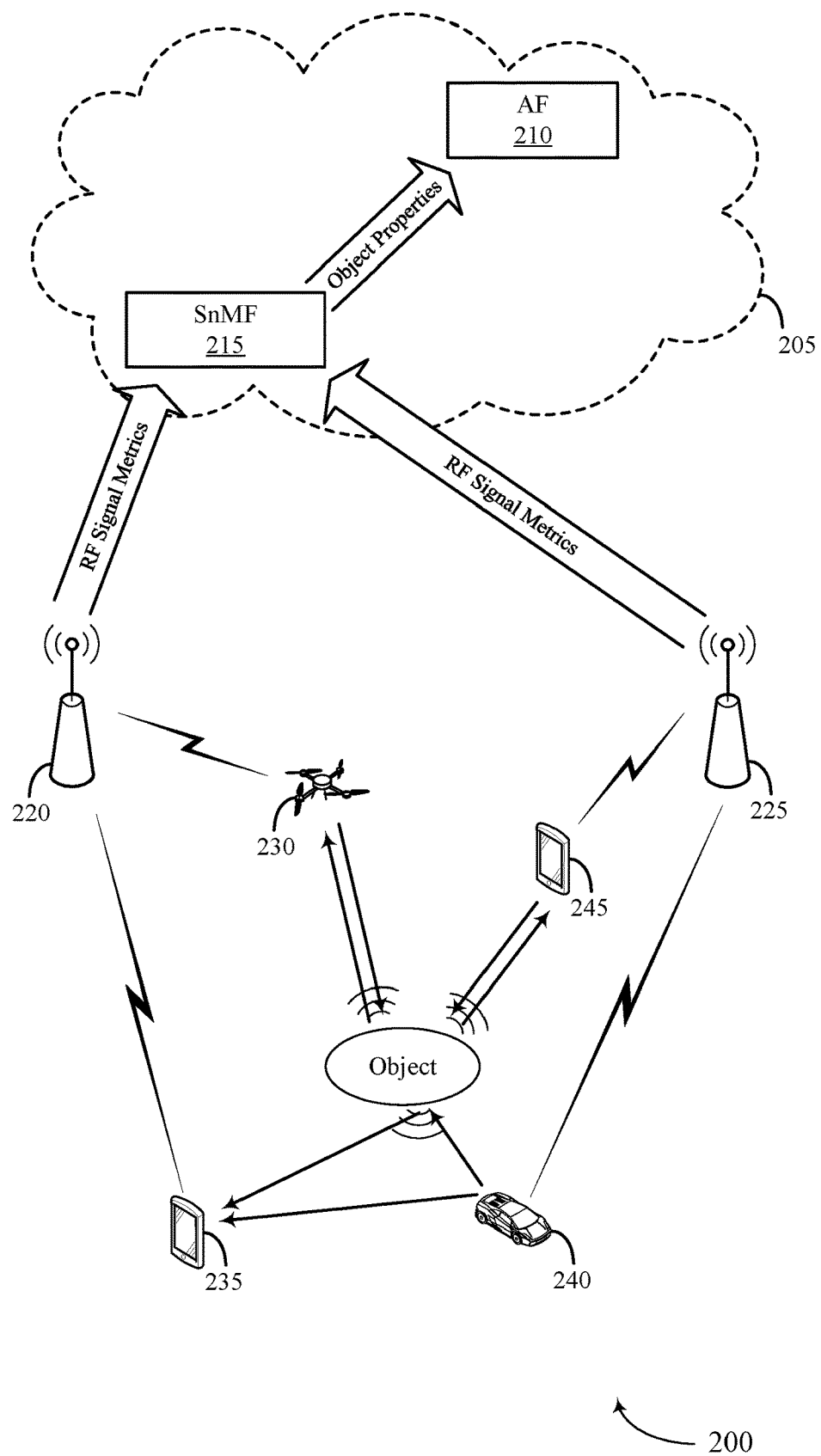
FIG. 2 illustrates an example of a wireless communications system that supports architecture options for cooperative sensing and positioning in accordance with aspects of the present disclosure.

FIG. 2 illustrates an example of a wireless communications system 200 that supports architecture options for cooperative sensing and positioning in accordance with aspects of the present disclosure. In some examples, wireless communications system 200 may implement aspects of wireless communications system 100. Wireless communications system 200 may include, but is not limited to, a core network 205 comprising AF 210 and SnMF 215, base station 220, base station 225, UE 230, UE 235, UE 240, and UE 245, which may be examples of corresponding devices described herein. In some aspects, base station 220, base station 225, UE 230, UE 235, UE 240, and UE 245 may constitute at least a portion of a RAN, such as an LTE RAN, LTE-A RAN, NR RAN, 5G RAN, 5G access network (5G-AN), etc. In some aspects, base station 220, base station 225, UE 230, UE 235, UE 240, and UE 245 may also be referred to generically as wireless nodes of the RAN.

Wireless communications systems typically support various positioning technologies (e.g., RTT), OTDOA, UTDOA, E-CID, and so forth). These techniques are generally considered active localization techniques, which are based on direct or transmitted RF waves, e.g., each technology requires the UE whose position is being determined to be able to perform an RF transmission. Accordingly, each technology may be dependent upon the capabilities of the UE. These technologies, however, do not support passive sensing capabilities where the object being sensed may not have an RF signal transmitter. That is, some wireless communications systems may not support passive sensing where the target(s) or object(s) to be located or mapped do not include an RF device compatible with the wireless network, which may be referred to as passive RF sensing or simply RF sensing. RF sensing applications include, but are not limited to, health monitoring (e.g., heartbeat detection/tracking, respiration rate monitoring, etc.), contextual information acquisition (e.g., location detection/tracking, direction finding, range tracking, etc.), automotive RADAR (e.g., smart cruise control, collision avoidance, etc.), and the like.

RF sensing may generally be categorized according to the location of the device performing the RF signal transmission and the device receiving the reflection of the RF signal transmission off of the object. A co-located transmitter/receiver pair is generally considered monostatic RADAR and, in some aspects, may utilize full duplex technologies. One non-limiting example of monostatic RADAR includes UE 230 which may perform the RF signal transmission and then receive the RF signal reflected off of the object. A non-co-located transmitter/receiver pair is generally considered a bi-static RADAR which includes the device performing RF signal transmission being located separately from the device receiving the reflection of the RF signal off of the object. One non-limiting example of bi-static RADAR includes UE 235 and UE 240 in which UE 240 performs RF signal transmission and UE 235 receives the reflection of the RF signal off of the object. RF sensing of object(s) may use any combination of monostatic RADAR and/or bi-static RADAR. In some examples, RF sensing of object(s) may use multi-static RADAR, which may be monostatic based, bi-static based, multi-transmitter, or multi-receiver configurations.

In some examples, aspects of the RF signal transmission and the RF signal reflected off of the object as received by the wireless node may constitute RF signal metrics associated with the object. For example, transmit timing, transmit frequency, transmit power, transmit direction (e.g., angle of departure (AoD), location/position of the transmitter, speed of the transmitter, direction of travel of the transmitter, and the like), may constitute at least a portion of the RF signal metrics associated with the object. Similarly, receive timing, receive frequency, receive power, receive direction (e.g., angle of arrival (AoA), location of the receiver, speed of the receiver, direction of travel of the receiver, and the like), may constitute another portion of the RF signal metrics associated with the object. The RF signal metrics associated with an object may be utilized, processed, etc., to determine various properties of the object. For example, such properties may include, but are not limited to, the location of the object, the size of the object, the shape of the object, the characteristics of the object, movement of the object, speed of the object, direction of travel of the object, and the like. Some examples of the characteristics of the object include, but are not limited to, movement of at least a portion of the object, orientation of the object, changes with respect to some portion(s) or all of the object, and the like.

RF sensing is generally computationally expensive (e.g., requires extensive processing capabilities), similar to positioning technologies. However, RF sensing is different from positioning. For example, positioning generally refers to determining the location of a wireless node (e.g., a UE and/or base station) in fixed terms (e.g., a geographical location) and/or in relative terms (e.g., with respect to a known object, structure, etc.). Positioning is typically handled by a location management function of the core network 205 in cooperation with base station(s) and/or UE(s) of the RAN. The positioning information may be utilized for tracking and mobility, resource selection/allocation, relay operations, and the like. RF sensing, on the other hand, generally refers to determining various properties of an object without input, cooperation, and/or coordination from the object being sensed. For example, wireless nodes of the RAN may utilize RF sensing techniques to detect and/or quantify a pedestrian, a non-wireless vehicle, a structure, a component within a factory setting, a component of the environment (e.g., a tree), animals, bicyclist, and the like.

As discussed, the lack of support for such passive RF sensing may eliminate the ability to leverage a deployed cellular wireless communications system to support cooperative sensing and positioning. That is, wireless communications systems are currently not equipped to support RF sensing techniques. This may limit the ability to develop mapping information (e.g., an environmental picture, a 3D map, tracking information within a factory setting, situational awareness information for the vehicle-based wireless communications system, etc.). This may lead to reduced optimizations within a wireless communications system due to unknown objects interfering with wireless communications, obstructing movement of wireless nodes, and the like. This may also eliminate the ability to identify, track, or otherwise monitor object(s) proximate to wireless nodes of the RAN.

Accordingly, aspects of the described techniques introduce various examples of an architecture that may be implemented in wireless communications system 200 that supports or otherwise enables cooperative RF sensing. For example, SnMF 215 may generally be deployed within core network 205 of the wireless communications system 200 to monitor, control, or otherwise manage various aspects of RF sensing. In some examples, this may include SnMF 215 processing the RF signal metrics associated with one or more objects that are received from various wireless nodes of the RAN (e.g., such as base station 220 and/or base station 225 as well as any of the UEs). SnMF 215 may identify or otherwise determine the properties of the object based on the RF signal metrics. SnMF 215 may transmit or otherwise provide an indication of the properties of the object(s) to AF 210 (e.g., an NG-AP), which uses this information to identify or otherwise determine mapping information for the object(s), e.g., which may be part of larger mapping operation within wireless communications system 200.

In some aspects, SnMF 215 may be implemented in hardware and/or software within core network 205. SnMF 215 may be implemented as an independent/separate component/function within core network 205 and/or may be combined with one or more other component(s)/function(s) within core network 205, such as an LMF. SnMF 215 may operate as a service-based component within the core network 205 and the interaction between SnMF 215 and other core network functions may be a service-based representation and/or a reference point representation. For example, the service based representation may include the network functions (e.g., SnMF 215, AF 210, LMF, AMF, etc.) within the control plane enabling other authorized network functions to access their services (which may include point-to-point reference points where necessary). The reference point representation may include the interaction existing between the network function services in the network functions described as point-to-point reference points (e.g., N11) between any two network functions (e.g., between AF 210 and SnMF 215). Accordingly, SnMF 215 may communicate with AF 210 via one or more interfaces within core network 205, e.g., a service based interface, such as an Naf interface, an Nsnmf interface, an Namf interface, and/or a reference point interface, such as an N5 interface, an N11, interface, an N14 interface, an N2 interface (e.g., when obtaining RF signal metrics from wireless nodes of the RAN), and the like. In some aspects, an existing interface may be utilized for communications/coordination between SnMF 215 and other core network functions and/or a new interface (e.g., an Nsnmf interface) may be created for communications/coordination between SnMF 215 and other core network functions of core network 205. Accordingly, references to SnMF 215 and/or other network functions providing, obtaining, etc., may generally refer to information transmitted or otherwise conveyed via any interface between the various network entities.

SnMF 215 may obtain RF signal metrics from wireless node(s) of the RAN. For example, SnMF 215 may obtain the RF signal metrics from base station 220 and/or base station 225 (e.g., via N2 interface) as shown in FIG. 2 and/or from UE 230, UE 235, UE 240, and/or UE 245 (e.g., via an N1 interface). For example, UE 230 (and/or any other wireless nodes within wireless communications system 200) may perform the RF signal transmission, receive the RF signal reflected off of the object (e.g., in a monostatic RADAR scenario), and then provide the RF signal metrics to SnMF 215 via base station 220. SnMF 215 may obtain the RF signal metrics directly from the wireless nodes and/or indirectly via an AMF (and/or some other function) within core network 205. SnMF 215 may use the RF signal metrics to identify or otherwise determine the properties of the object (e.g., location, orientation, movement, etc.). For example, SnMF 215 may obtain RF signal metrics from one, or more than one, of the wireless nodes within the RAN for an object and use each set of RF signal metrics to determine the properties of the object. SnMF 215 may transmit, provide, or otherwise convey an indication of the properties of the object(s) to AF 210, which uses the object properties to determine mapping information for wireless communications system 200. The mapping information may include, but is not limited to, the location of the object, the positioning/orientation of the object, movement of the object, speed of the object, travel direction of the object, presence of the object, identification of the object, movement within the object (e.g., some portion, part, component, etc., of the object that changes), and the like. SnMF 215 may provide the indication of the properties of the object to AF 210 independently (e.g., automatically as SnMF 215 determines properties of object(s)) and/or in response to a sensing query received from AF 210.

For example, AF 210 may transmit, provide, or otherwise convey a sensing query to SnMF 215. That is, AF 210 may issue a sensing request to SnMF 215. The sensing query may generally carry or otherwise convey a request for information (e.g., properties) associated with an object, a subset of objects, a region, and/or any objects for which SnMF 215 has identified properties for. The sensing query may be provided to SnMF 215 via a service based interface and/or a reference point interface. AF 210 may transmit, provide, or otherwise convey the sensing query periodically and/or as needed. For example, AF 210 may receive, identify, or otherwise obtain a mapping request from application(s) within the application layer. AF 210 may provide the sensing query to SnMF 215 in response. In another example, AF 210 may periodically provide the sensing query in order to maintain a current or otherwise up-to-date set of mapping information for object(s) within wireless communications system 200. In another example, AF 210 may provide the sensing query in response to a sensing notification received from SnMF 215. For example, SnMF 215 may identify and/or quantify properties for an object based on RF signal metrics received from wireless nodes of the RAN. In response, SnMF 215 may trigger a mapping information update indication to AF 210 signaling that there are object properties to convey. AF 210 may provide the sensing query in response.

Based on the sensing query, techniques described herein may provide for capabilities exchange between SnMF 215 and RAN nodes, RAN node selection and configuration, sensing session execution (sensing signal transmission and measurements), sensing computation (at the RAN nodes, SnMF 215, or distributed), and a sensing response from SnMF 215 to AF 210.

As is illustrated and discussed below, various architecture designs are proposed for implementation of these cooperative sensing and positioning techniques utilizing SnMF 215.

Figure 3A:
FIGS. 3A and 3B illustrate examples of an architecture that supports architecture options for cooperative sensing and positioning in accordance with aspects of the present disclosure.
Figure 3B:
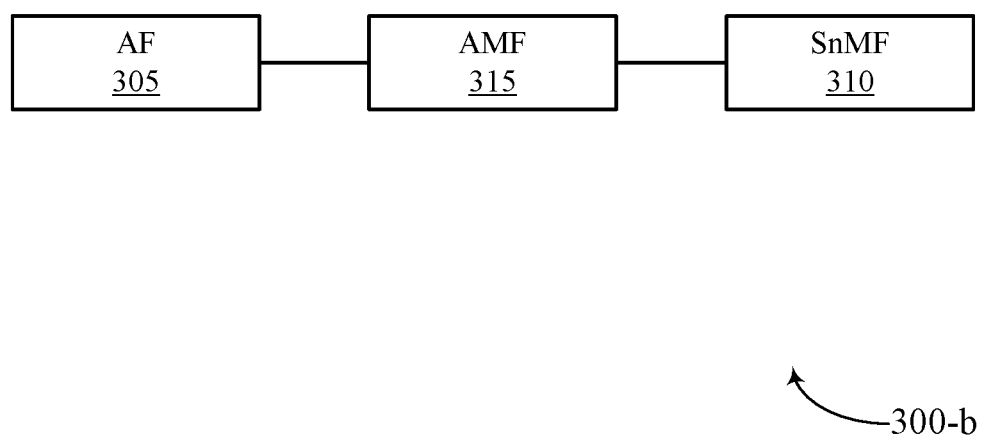

FIGS. 3A and 3B illustrate examples of an architecture 300 that supports architecture options for cooperative sensing and positioning in accordance with aspects of the present disclosure. In some examples, architecture 300 may implement aspects of wireless communications systems 100 and/or 200. Architecture 300 may include AF 305, SnMF 310, and/or AMF 315, which may be examples of the corresponding devices described herein. In some aspects, AF 305 and SnMF 310 are components, functions, etc., within a core network associated with a wireless communications system (e.g., with a RAN, such as a 5G-AN RAN). Generally, architecture 300-*a* of FIG. 3A illustrates an example where AF 305 and connected directly to SnMF 310 and architecture 300-*b* of FIG. 3B illustrates an example where AF 305 is connected to SnMF 310 via AMF 315.

As discussed above, aspects of the described techniques support SnMF 310 being deployed within a core network to monitor, control, or otherwise manage aspects of passive RF sensing techniques. For example, SnMF 310 may identify or otherwise obtain RF signal metrics from wireless nodes of a RAN (e.g., from base station(s) and/or UE(s) within the RAN). The RF signal metrics may be based on a transmitter performing RF signal transmissions directed towards an object and a receiver receiving the reflections of the RF signal off of the object. The wireless nodes (e.g., transmitter/receiver) may be configured as monostatic, bi-static, or multi-static RADAR configurations. A multi-static RADAR configuration may include monostatic based, bi-static based, multi-transmit, or multi-receive configurations. The wireless nodes may provide the RF signal metrics based on the RF signal reflections. For example, the wireless node may provide the RF signal metrics to SnMF 310 as raw data for the RF signal reflections and/or as information derived based on the RF signal reflections. For example, the wireless nodes may identify or otherwise determine various information associated with the RF signal reflections and report that information as the RF signal metrics to SnMF 310. Examples of the information may include an AoD for the RF signal transmission, an AoA for the RF signal reflections, a transmit power for the RF signal transmissions, a receive power for the RF signal reflections, a transmit timing for the RF signal transmissions, a receive timing for the RF signal reflections, and the like.

SnMF 310 may obtain the RF signal metrics from the wireless node(s) of the RAN and use this information to determine properties of the object(s). For example, SnMF 310 may use the RF signal metrics to determine the object location, orientation, movement, speed, direction of travel, and the like. SnMF 310 may transmit, provide, or otherwise convey an indication of the object properties to AF 305, which may determine mapping information for the object(s). SnMF 310 may provide the indication of the properties to AF 305 independently (e.g., based on SnMF 310 determining properties for the object(s)) and/or in response to a sensing query received from AF 305).

As illustrated in architecture 300-*a* of FIG. 3A, AF 305 and SnMF 310 may be directly connected. For example, a direct interface may be established between AF 305 and SnMF 310. The interface may be a new interface (e.g., an Naf interface, an Nsnmf interface, an Naf-snmf interface, an Nsnmf-af interface, and the like) and/or an existing interface may be used for communication between AF 305 and SnMF 310 (e.g., an Naf interface, an Namf interface, an N11 interface, an N14 interface, and the like). The direct connection between AF 305 and SnMF 310 may reduce latency, improve reliability, etc., for the communications between AF 305 and SnMF 310.

As illustrated in architecture 300-*b* of FIG. 3B, AF 305 and SnMF 310 may be connected indirectly via AMF 315. For example, a direct interface may be established between AF 305 and AMF 315 and a direct interface may be established between AMF 315 and SnMF 310. Either interface may be a new interface (e.g., an Naf interface, an Nsnmf interface, an Naf-snmf interface, an Nsnmf-af interface, an Namf-af interface, an Namf-snmf interface, and the like) and/or an existing interface may be used for communication between AF 305 and SnMF 310 via AMF 315 (e.g., an Naf interface, an Namf interface, an Nsnmf interface, an N11 interface, an N14 interface, and the like). The indirect connection between AF 305 and SnMF 310 via AMF 315 may provide increased flexibility, reduced processing, and the like, for the indirect communications between AF 305 and SnMF 310. Accordingly, communications between AF 305 and SnMF 310 via AMF 315 may include SnMF 310 providing the indication of the properties of the object(s) to AF 305 via a third network entity (e.g., AMF 315) of the core network. Similarly, this may include AF 305, in the scenario where AF 305 provides a sensing query to SnMF 310, providing the sensing query to a third network entity (e.g., AMF 315) for forwarding to SnMF 310.

Figure 4A:
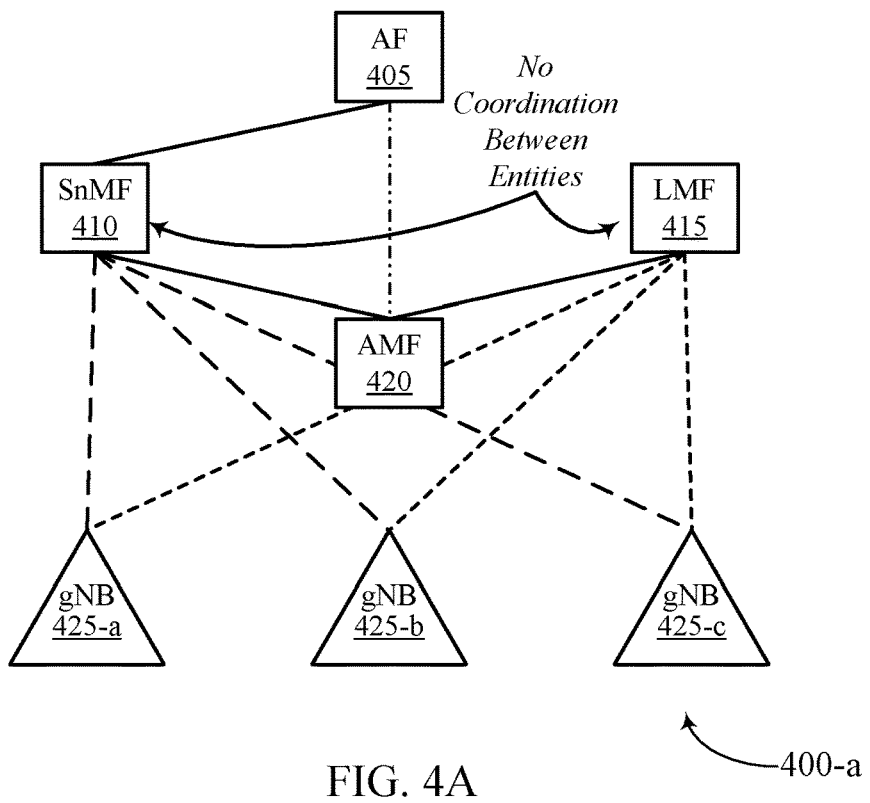
FIGS. 4A and 4B illustrate examples of an architecture that supports architecture options for cooperative sensing and positioning in accordance with aspects of the present disclosure.
Figure 4B:
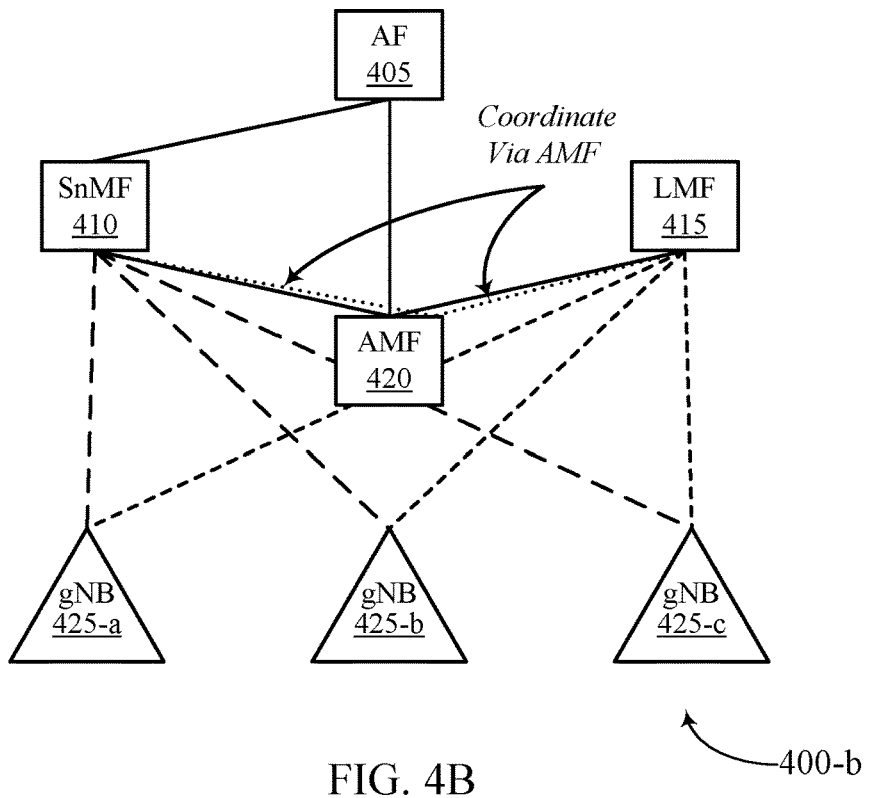

FIGS. 4A and 4B illustrate examples of an architecture 400 that supports architecture options for cooperative sensing and positioning in accordance with aspects of the present disclosure. In some examples, architecture 400 may implement aspects of wireless communications systems 100 and/or 200 and/or architecture 300. Architecture 400 may include AF 405, SnMF 410, LMF 415, AMF 420, and one or more gNBs 425 (with three base stations 425-*a*, 425-*b*, and 425-*c* being shown by way of example only), which may be examples of the corresponding devices described herein. In some aspects, AF 405, SnMF 410, LMF 415, and/or AMF 420 are components, functions, etc., within a core network associated with a wireless communications system (e.g., with a RAN, such as a 5G-AN RAN). Generally, architecture 400-*a* of FIG. 4A illustrates an example where there is no coordination between SnMF 410 and LMF 415 and architecture 400-*b* of FIG. 4B illustrates an example where there is coordination between SnMF 410 and LMF 415.

As discussed above, aspects of the described techniques support SnMF 410 being deployed within a core network to monitor, control, or otherwise manage aspects of passive RF sensing techniques. For example, SnMF 410 may identify or otherwise obtain RF signal metrics from wireless nodes of a RAN (e.g., from base station(s) and/or UE(s) within the RAN, such as gNB 425-*a*, gNB 425-*b*, and/or gNB 425-*c*). The RF signal metrics may be based on a transmitter performing RF signal transmissions directed towards an object and a receiver receiving the reflections of the RF signal off of the object. The wireless nodes (e.g., transmitter/receiver) may be configured as monostatic, bi-static, or multi-static RADAR configurations. The wireless nodes may provide the RF signal metrics based on the RF signal reflections. For example, the wireless node may provide the RF signal metrics to SnMF 410 as raw data for the RF signal reflections and/or as information derived based on the RF signal reflections. For example, the wireless nodes may identify or otherwise determine various information associated with the RF signal reflections and report that information as the RF signal metrics to SnMF 410. Examples of the information may include an AoD for the RF signal transmission, an AoA for the RF signal reflections, a transmit power for the RF signal transmissions, a receive power for the RF signal reflections, a transmit timing for the RF signal transmissions, a receive timing for the RF signal reflections, a transmit frequency for the RF signal transmissions, a receive frequency for the RF signal reflections, and the like.

SnMF 410 may obtain the RF signal metrics from the wireless node(s) of the RAN and use this information to determine properties of the object(s). For example, SnMF 410 may use the RF signal metrics to determine the object location, orientation, movement, speed, direction of travel, and the like. SnMF 410 may transmit, provide, or otherwise convey an indication of the object properties to AF 405, which determines mapping information for the object(s). SnMF 410 may provide the indication of the properties to AF 405 independently (e.g., based on SnMF 410 determining properties for the object(s)) and/or in response to a sensing query received from AF 405).

In some aspects, SnMF 410 may also consider positioning information when determining the properties of the object(s). For example, LMF 415 may be deployed within the core network to provide location management functions. LMF 415 may support location determination for wireless node(s) within the RAN (e.g., location determination for UE(s) within the RAN). For example, LMF 415 may obtain downlink location measurements or a location estimate from the wireless node(s), uplink location measurements from the RAN, and the like. Accordingly, LMF 415 may support location determinations being made. LMF 415 may generally coordinate with gNB 425 via AMF 420 and/or directly to determine such location information.

As illustrated in architecture 400-*a* of FIG. 4A, there is no coordination between SnMF 410 and LMF 415. Accordingly, SnMF may identify or otherwise determine the parameters for the object(s) based on the RF signal metrics received from the wireless node(s) of the RAN.

However, in some examples SnMF 410 may receive or otherwise obtain positioning information for the wireless node(s) and/or the object from LMF 415, and use the positioning information when determining the properties of the object(s). That is, in one example, SnMF 410 may receive positioning information from LMF 415 for the wireless node(s) providing the RF signal metrics to SnMF 410. The positioning information may include, for each wireless node, the location of the wireless node, movement of the wireless node, travel direction of the wireless node, etc. SnMF 410 may use the positioning information along with the RF signal metrics to determine the properties of the object(s).

In some aspects, SnMF 410 may provide some or all of the RF signal metrics of the object(s) to LMF 415, which may utilize its positioning protocols to determine positioning information for the object(s). For example, SnMF 410 may provide the RF signal metrics to LMF 415 directly and/or the wireless nodes of the RAN (e.g., gNB 425) may provide the RF signal metrics to LMF 415 in addition to SnMF 410. LMF 415 may identify or otherwise determine the positioning information for the wireless node(s) and/or object(s) to SnMF 410, which may be considered at least a portion of the object properties.

Accordingly, and as illustrated in architecture 400-*b* of FIG. 4B, SnMF 410 and LMF 415 may coordinate via AMF 420 to exchange positioning information. The coordination may occur over an existing interface (e.g., Namf/Nlmf interfaces). For example, AMF 420 may provide the RF signal metrics to both SnMF 410 and LMF 415 from the wireless node(s) of the RAN.

Figure 5A:
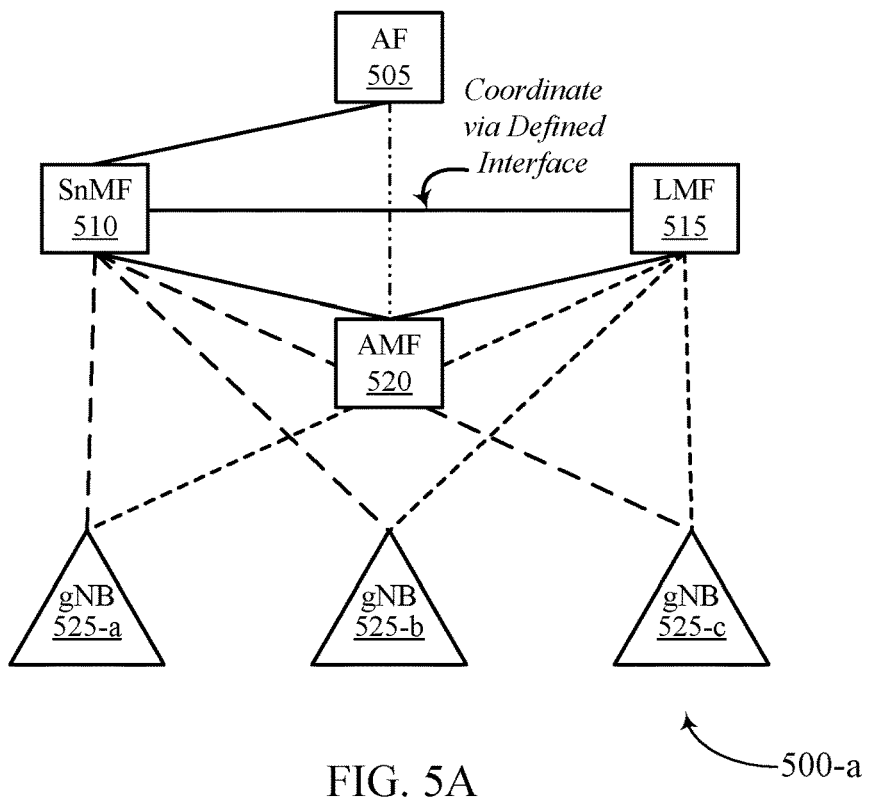
FIGS. 5A and 5B illustrate examples of an architecture that supports architecture options for cooperative sensing and positioning in accordance with aspects of the present disclosure.
Figure 5B:
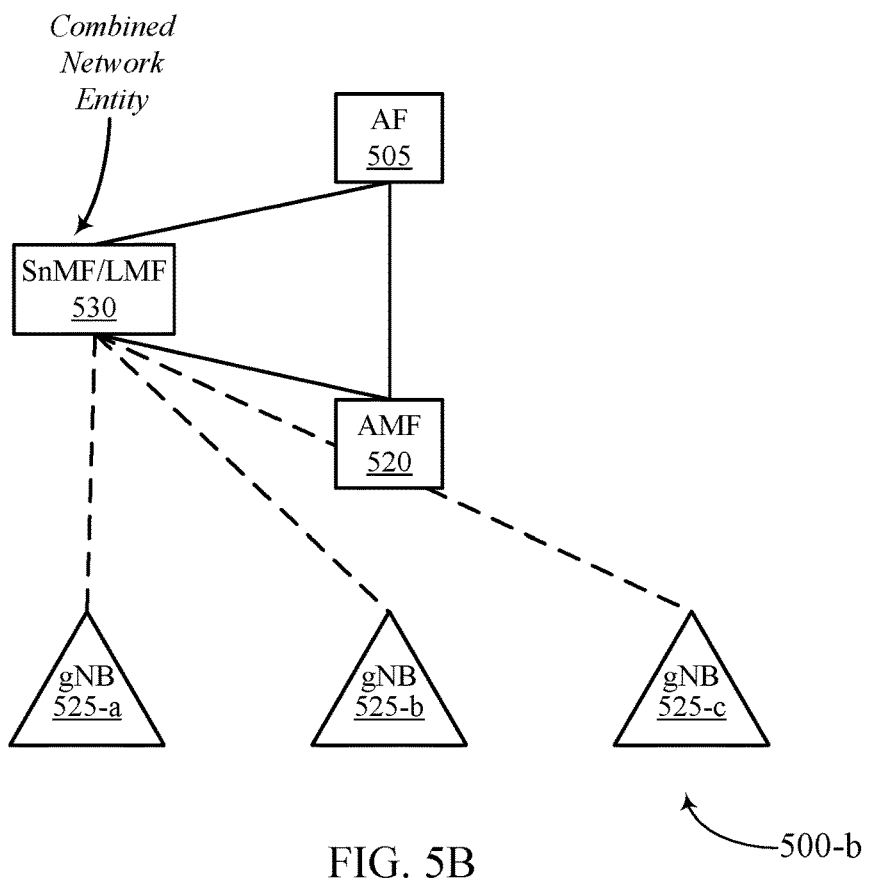

FIGS. 5A and 5B illustrate examples of an architecture 500 that supports architecture options for cooperative sensing and positioning in accordance with aspects of the present disclosure. In some examples, architecture 500 may implement aspects of wireless communications systems 100 and/or 200 and/or architectures 300 and/or 400. Architecture 500 may include AF 505, SnMF 510, LMF 515, AMF 520, combined network entity 530, and one or more gNBs 525 (with three base stations 525-*a*, 525-*b*, and 525-*c* being shown by way of example only), which may be examples of the corresponding devices described herein. In some aspects, AF 505, SnMF 510, LMF 515, AMF 520, and/or combined network entity 530 are components, functions, etc., within a core network associated with a wireless communications system (e.g., with a RAN, such as a 5G-AN RAN). Generally, architecture 500-*a* of FIG. 5A illustrates an example where a direct interface is defined between SnMF 510 and LMF 515 and architecture 500-*b* of FIG. 5B illustrates an example where SnMF 510 and LMF 515 are combined into a combined network entity 530.

As discussed above, aspects of the described techniques support SnMF 510 being deployed within a core network to monitor, control, or otherwise manage aspects of passive RF sensing techniques. For example, SnMF 510 may identify or otherwise obtain RF signal metrics from wireless nodes of a RAN (e.g., from base station(s) and/or UE(s) within the RAN, such as gNB 525-*a*, gNB 525-*b*, and/or gNB 525-*c*). The RF signal metrics may be based on a transmitter performing RF signal transmissions directed towards an object and a receiver receiving the reflections of the RF signal off of the object. The wireless nodes (e.g., transmitter/receiver) may be configured as monostatic or bi-static RADAR configurations. The wireless nodes may provide the RF signal metrics based on the RF signal reflections. For example, the wireless node may provide the RF signal metrics to SnMF 510 as raw data for the RF signal reflections and/or as information derived based on the RF signal reflections. For example, the wireless nodes may identify or otherwise determine various information associated with the RF signal reflections and report that information as the RF signal metrics to SnMF 510. Examples of the information may include an AoD for the RF signal transmission, an AoA for the RF signal reflections, a transmit power for the RF signal transmissions, a receive power for the RF signal reflections, a transmit timing for the RF signal transmissions, a receive timing for the RF signal reflections, a transmit frequency for the RF signal transmissions, a receive frequency for the RF signal reflections, etc.

SnMF 510 may obtain the RF signal metrics from the wireless node(s) of the RAN and use this information to determine properties of the object(s). For example, SnMF 510 may use the RF signal metrics to determine the object location, orientation, movement, speed, direction of travel, and the like. SnMF 510 may transmit, provide, or otherwise convey an indication of the object properties to AF 505, which determines mapping information for the object(s). SnMF 510 may provide the indication of the properties to AF 505 independently (e.g., based on SnMF 510 determining properties for the object(s)) and/or in response to a sensing query received from AF 505).

In some aspects, SnMF 510 may also consider positioning information when determining the properties of the object(s). For example, LMF 515 may be deployed within the core network to provide location management functions. LMF 515 may support location determination for wireless node(s) within the RAN (e.g., location determination for UE(s) within the RAN). For example, LMF 515 may obtain downlink location measurements or a location estimate from the wireless node(s), uplink location measurements from the RAN, and the like. Accordingly, LMF 515 may support location determinations being made. LMF 515 may generally coordinate with gNB 525 via AMF 520 and/or directly to determine such location information.

As illustrated in architecture 500-*a* of FIG. 5A, a defined interface is established between SnMF 510 and LMF 515 to support coordination. The interface may allow SnMF 510 and LMF 515 to exchange information, such as configuration exchanges, measurement reports, scheduled transmission information, and the like. Accordingly, SnMF 510 may obtain the positioning information associated with the wireless node(s) of the RAN and/or the object(s) from LMF 515 via the defined interface. The interface established between SnMF 510 and LMF 515 may include a new interface being established (e.g., an Nlmf-snmf interface, an Nsnmf-lmf interface, an Npositioning interface, an Nsensing interface, and the like) and/or an existing interface being used for such coordination (e.g., an NLs interface). Accordingly, a direct interface may be established that allows SnMF 510 and LMF 515 to exchange information without having to go through AMF 520. Accordingly, SnMF 510 may obtain the positioning information via an interface established between SnMF 510 and LMF 515.

As illustrated in architecture 500-*b* of FIG. 5B, SnMF 510 and LMF 515 may be combined into a combined network entity 530 of the core network. Accordingly, the SnMF and LMF functions of the core network are merged into a single entity (e.g., the combined network entity 53). The combined network entity 530 may perform the traditional tasks of an LMF function, as well as supporting the functionalities of the SnMF entity as described herein. This may simplify the exchange of information between the SnMF and LMF functions of the core network, reduce latency, improve processing speed, and the like.

Figure 6:
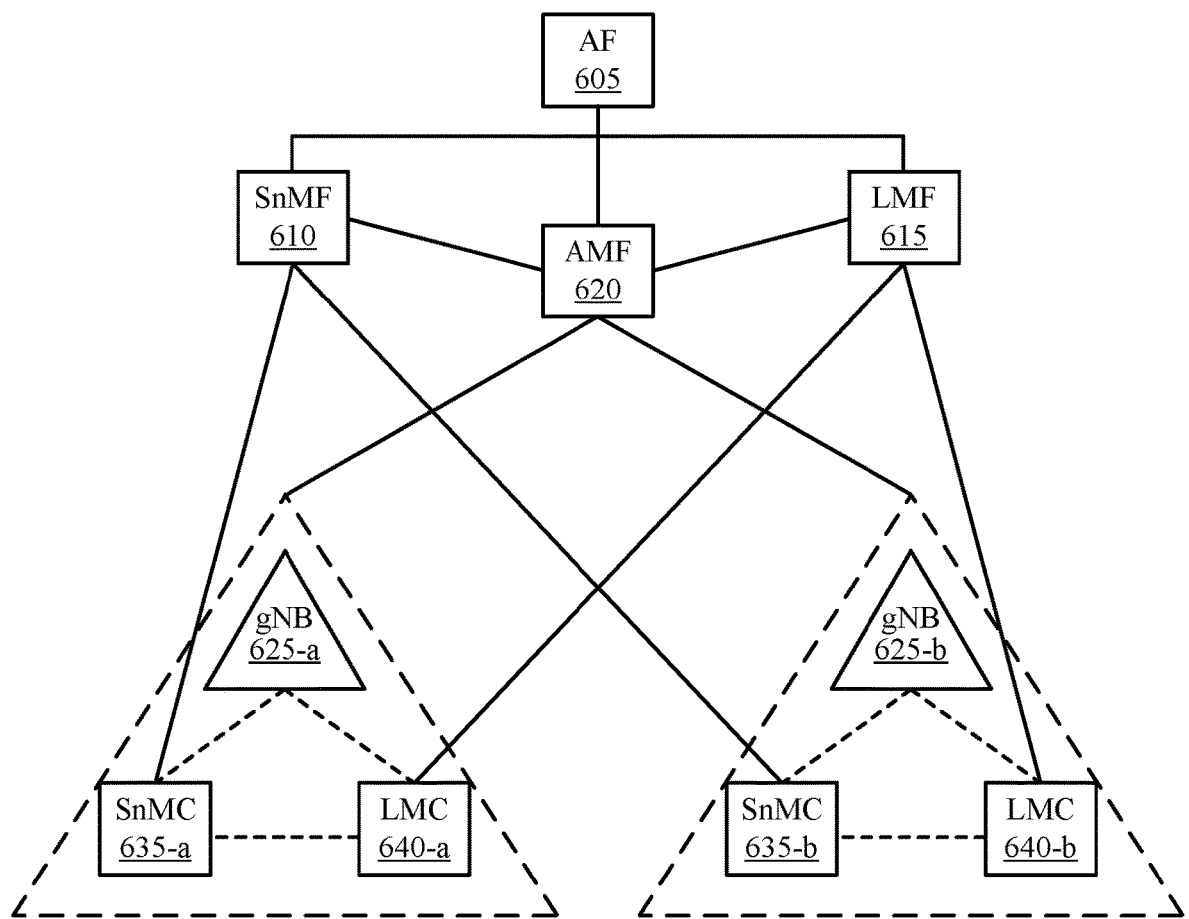
FIG. 6 illustrates an example of an architecture that supports architecture options for cooperative sensing and positioning in accordance with aspects of the present disclosure.

FIG. 6 illustrates an example of an architecture 600 that supports architecture options for cooperative sensing and positioning in accordance with aspects of the present disclosure. In some examples, architecture 600 may implement aspects of wireless communications systems 100 and/or 200 and/or architectures 300, 400, and/or 500. Architecture 600 may include AF 605, SnMF 610, LMF 615, AMF 620, one or more gNBs 625 (with two base stations 625-*a* and 625-*b* being shown by way of example only) SnMC 635 and LMC 640, which may be examples of the corresponding devices described herein. In some aspects, AF 605, SnMF 610, LMF 615, and/or AMF 620, are components, functions, etc., within a core network associated with a wireless communications system (e.g., with a RAN, such as a 5G-AN RAN). Generally, architecture 600 illustrates an example where a RAN-based SnMC 635 is introduced in support of aspects of the described techniques.

As discussed above, aspects of the described techniques support SnMF 610 being deployed within a core network to monitor, control, or otherwise manage aspects of passive RF sensing techniques. For example, SnMF 610 may identify or otherwise obtain RF signal metrics from wireless nodes of a RAN (e.g., from base station(s) and/or UE(s) within the RAN, such as gNB 625-*a*, gNB 625-*b*, and/or gNB 625-*c*). The RF signal metrics may be based on a transmitter performing RF signal transmissions directed towards an object and a receiver receiving the reflections of the RF signal off of the object. The wireless nodes (e.g., transmitter/receiver) may be configured as monostatic or bi-static RADAR configurations. The wireless nodes may provide the RF signal metrics based on the RF signal reflections. For example, the wireless node may provide the RF signal metrics to SnMF 610 as raw data for the RF signal reflections and/or as information derived based on the RF signal reflections. For example, the wireless nodes may identify or otherwise determine various information associated with the RF signal reflections and report that information as the RF signal metrics to SnMF 610. Examples of the information may include an AoD for the RF signal transmission, an AoA for the RF signal reflections, a transmit power for the RF signal transmissions, a receive power for the RF signal reflections, a transmit timing for the RF signal transmissions, a receive timing for the RF signal reflections, a transmit frequency for the RF signal transmissions, a receive frequency for the RF signal reflections, and the like.

SnMF 610 may obtain the RF signal metrics from the wireless node(s) of the RAN and use this information to determine properties of the object(s). For example, SnMF 610 may use the RF signal metrics to determine the object location, orientation, movement, speed, direction of travel, and the like. SnMF 610 may transmit, provide, or otherwise convey an indication of the object properties to AF 605, which determines mapping information for the object(s). SnMF 610 may provide the indication of the properties to AF 605 independently (e.g., based on SnMF 510 determining properties for the object(s)) and/or in response to a sensing query received from AF 605).

Architecture 600 illustrates an example where SnMC 635 and/or LMC 640 may be implemented with the RAN. SnMC 635 and/or LMC 640 may be implemented within the protocol stack of the RAN. For example, SnMC 635 and/or LMC 640 may be implemented as logical functions/entities within the protocol stack. The SnMC 635 may be implemented at wireless node(s) within the RAN, e.g., implemented within gNB(s) 625 and/or UE(s) of the RAN. The SnMC 635 and/or LMC 640 may communicate with SnMF 610 and/or LMF 615, respectively. That is, the information packaged and conveyed (e.g., the RF signal metrics) to SnMC 635 and/or the information conveyed to LMF 615 (e.g., the positioning information) may be provided within the protocol stack. Aspects of SnMC 635 and/or LMC 640 may be implemented within layer one, layer two, and/or layer three of the protocol stack. In some aspects, SnMC 635 and/or LMC 640 may be implemented within layer three of the protocol stack (e.g., similar to the IP/application layer). For example, SnMC 635-*a* associated with the protocol stack established by gNB 625-*a* may communicate with SnMF 610 and SnMC 635-*b* associated with the protocol stack established by gNB 625-*b* may communicate with SnMF 610. Similarly, LMC 640-*a* associated with the protocol stack established by gNB 625-*a* may communicate with LMF 615 and LMC 640-*b* associated with the protocol stack established by gNB 625-*b* may communicate with LMF 610.

SnMC 635 may reduce the latency incurred when the RF signal metrics are communicated to SnMF 610 via AMF 620. SnMC 635 may, from a latency perspective, act as the LMF 615 in that the SnMC 635 may obtain positioning information for the wireless node(s) and/or object(s) from LMC 640 and provide the positioning information to SnMF 610. In some examples, SnMC 635 and LMC 640 may not have a common interface. In this example, SnMC 635 and LMC 640 may communicate information via gNB 625. In another example, an interface may be established between SnMC 635 and LMC 640. This interface may allow the SnMC 635 and LMC 640 to exchange measurement reports, configuration information, and the like. In another example, SnMC 635 and LMC 640 may be merged into a combined entity/function within the RAN. In this example, the combined entity/function may be responsible for both location as well as sensing operations.

In some aspects, LMF 615 may be considered a global LMF and LMC 640 may be considered a local LMF on the gNB 625 side. Some coordination functions may be performed in the global LMF, while other coordination functions may in the local LMF. For example, LMF 615 may continue to perform location functions within the RAN while LMC 640 may provide positioning information that relates to RF sensing operations to SnMC 635 (which forwards the RF signal metrics and positioning information to SnMF 610). In some examples, the local LMFs (e.g., LMC 640-*a* and LMC 640-*b*) across different gNBs 625 may optionally communicate through a defined communication interface and/or through a gNB-to-gNB interface (e.g., a wired and/or wireless backhaul interface). Similarly, the local SnMCs (e.g., SnMC 635-*a* and SnMC 635-*b*) across different gNBs 625 may optionally communicate through a defined communication interface and/or through a gNB-to-gNB interface (e.g., a wired and/or wireless backhaul interface).

Accordingly, in some examples an SnMC 635 may receive, identify, or otherwise obtain a sensing query from SnMF 610. The sensing query may be for an object, a set of objects, and/or for any object for which RF signal metrics are available. The SnMC 635 may transmit, indicate, or otherwise provide a trigger signal to the wireless node(s) of the RAN requesting the RF signal metrics. In response, the SnMC 635 may obtain the RF signal metrics from the wireless node(s) and provide the RF signal metrics to SnMF 610. As discussed, in some examples the SnMC 635 may obtain positioning information from LMC 640 and provide the positioning information to SnMF 610 along with the RF signal metrics for the object(s).

Figure 7:
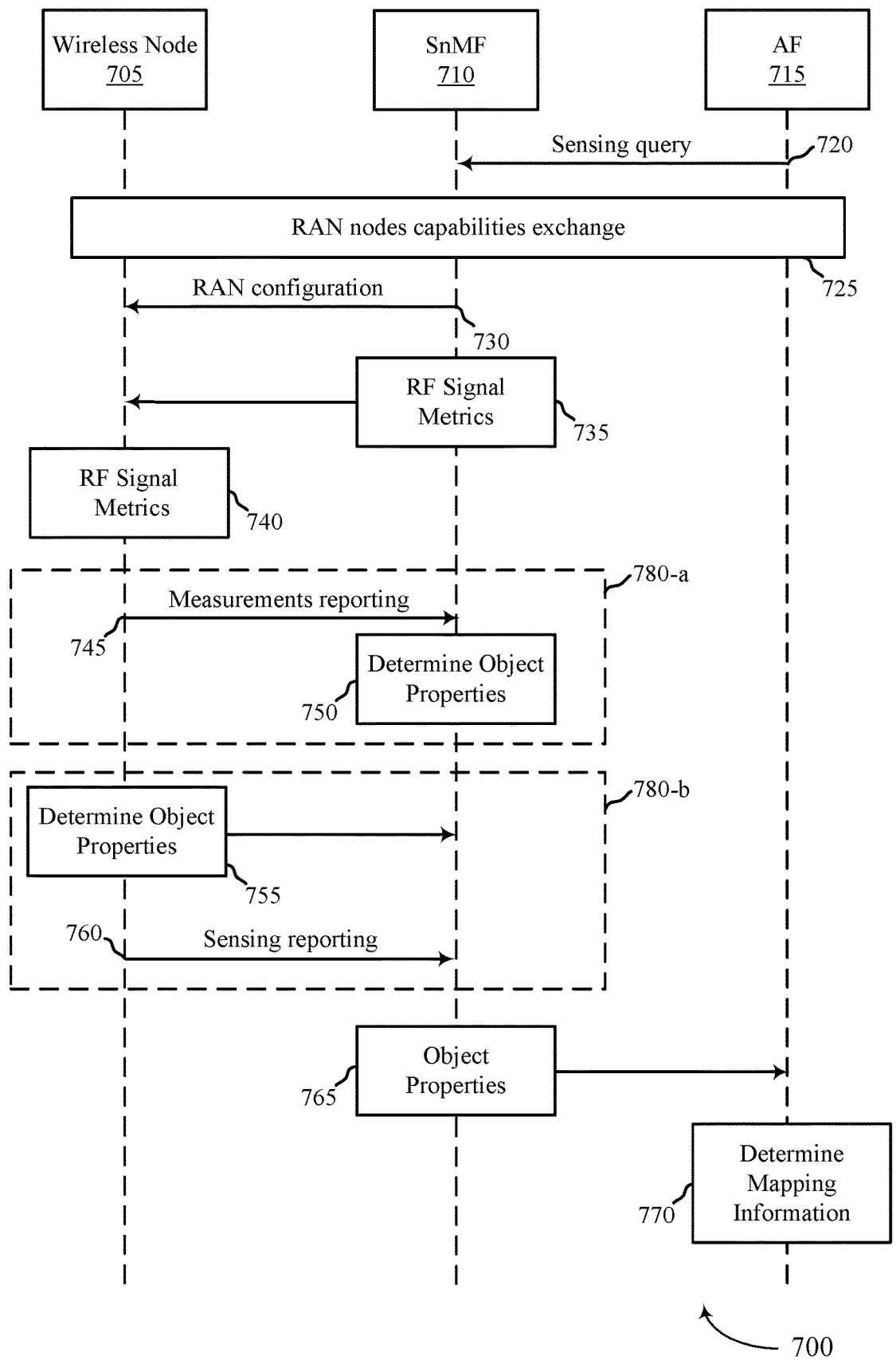
FIG. 7 illustrates an example of a process that supports architecture options for cooperative sensing and positioning in accordance with aspects of the present disclosure.

FIG. 7 illustrates an example of a process 700 that supports architecture options for cooperative sensing and positioning in accordance with aspects of the present disclosure. In some examples, process 700 may implement aspects of wireless communications systems 100 and/or 200 and/or architectures 300, 400, 500, and/or 600. Aspects of process 700 may be implemented by and/or implemented at wireless node 705, SnMF 710, and/or AF 715, which may be examples of corresponding devices described herein. In some aspects, wireless node 705 may be an example of a UE, base station, a central unit (CU), a distributed unit (DU), and/or any other wireless node within a RAN, which may include more than one wireless node 705. In some aspects, SnMF 710 and/or AF 715 may be associated with a core network associated with the RAN.

At 720, AF 715 may initiate the sensing activity by sending one or more sensing queries to one or more wireless nodes, such as SnMF 710. The sensing query may be for an object, a set of objects, and/or for any object for which RF signal metrics are available. AF 715 may be an external entity, an application residing on a UE, or a network entity (for network optimization purposes, e.g., adaptive beamforming).

At 725, one or more of wireless node 705, SnMF 710, and AF 715 may perform a RAN nodes capabilities exchange, which may include a sensing node selection. The set of involved RAN nodes may depend on one or more factors, such as region (gNBs and UEs around an area of interest), capability (e.g., monostatic sensing may use full-duplex capabilities and some nodes may not support sensing measurements or reporting), sensing method (e.g., gNB-based or bi-static UE-based), and availability (e.g., not all UEs may be able to participate because an accurate position should be known for an anchor node). The sensing configuration parameters to the RAN nodes may include sensing reference signal resources, beam management at transmit and receive nodes (e.g., quasi co-location (QCL) relations), a muting pattern (e.g., transmission pattern among the transmit nodes) and waveform configurations (e.g., bandwidth, power, sequence, etc.). For example, the SnMF 710 may provide, to the one or more wireless nodes of the radio access network, a sensing configuration, wherein the sensing configuration includes a sensing reference signal resource, an indication of beam management for one or more transmitters or receivers (e.g., base stations or UEs) of the radio access network, a muting pattern for the one or more transmitters of the RAN, a waveform configuration for transmissions by the one or more transmitters of the RAN, or a combination thereof.

For example, one or more of wireless node 705, SnMF 710, and AF 715 may inform others of the capabilities of the RAN nodes (e.g., a UE, DU, CU, or SnMF). For example, SnMF 710 may send a RAN configuration to wireless node 705 at 730, such as a base station or a UE served by the base station. For example, SnMF 710 may send a SnMF-RAN configuration to a CU or a SnMF-UE configuration to a UE. In another example, a CU may send a RAN-UE configuration to a UE. In some examples, a CU may send a RAN-UE configuration to a UE directly or the CU may coordinate another wireless node to send the RAN-UE configuration to the UE. A UE and a DU may perform sensing signal transmission and measurement collection. For example, SnMF 710 may configure the selected RAN nodes, including UEs and gNBs, and other network devices such as Reconfigurable Intelligent Surfaces (RISs) in a sensing session.

At 735, SnMF 710 may send one or more RF signal queries to one or more wireless nodes including wireless node 705. For example, SnMF 710 may send queries for performing RF transmissions or receptions. The queries may include parameters for performing RF transmissions or receptions such as AoA (e.g., a receive beam), AoD (e.g., a transmit beam), frequency, timing, and transmit power. For example, SnMF 710 may send a first query to a first wireless node 705 for an RF transmission including parameters for the RF transmission, and a second query to a second wireless node 705 for an RF reception including parameters for the RF reception (e.g., of reflections of the RF transmission off of one or more objects). The first and second wireless nodes may be the same or different base stations of the RAN, or may be nodes served by the same or different base stations of the RAN.

At 740, wireless node 705 may transmit, convey, or otherwise provide (and SnMF 710 may receive, identify, or otherwise obtain) RF signal metrics associated with reflections off of an object of RF signal transmissions associated with the RAN. In some aspects, wireless node 705 may convey or otherwise provide the RF signal metrics via an SnMC within the RAN. The SnMC of the RAN may operate separately from the LMF of the core network, may be combined with an LMC within the RAN to form a combined RAN component. SnMF 710 may receive additional RF signal metrics from additional wireless nodes 705 of the RAN, which may be associated with RF signal reflections from the same or different RF signal transmissions (e.g., transmitted by the same or different wireless nodes 705).

In one option 780-a, wireless node 705 may send a measurement report to SnMF 710 at 745. At 750, SnMF 710 may identify or otherwise determine properties of the object based on the RF signal metrics in the measurement report. For example, SnMF 710 may aggregate RF signal metrics to determine properties of objects. In some examples, the RF signal metrics received at 745 may include timing (e.g., RAN frame timing associated with transmission or reception of the RF signals or RF signal reflections), and thus SnMF 710 may combine RF signal metrics from different RF signal receivers (e.g., different wireless nodes) coherently. In some aspects, SnMF 710 may also obtain positioning information associated with the wireless node 705 and/or the object. SnMF 710 may identify or otherwise determine the properties of the object based on the RF signal metrics and positioning information. In some examples, SnMF 710 may obtain the positioning information from an LMF within the core network indirectly (e.g., via AMF) and/or using an interface established between SnMF 710 and the LMF. In some example, SnMF 710 may be merged with the LMF to form a combined network entity within the core network.

Alternatively, in option 780-b, wireless node 705 may identify or otherwise determine properties of the object based on the RF signal metrics at 755. For example, wireless node 705 may aggregate RF signal metrics to determine properties of objects. In some examples, the RF signal metrics may include timing (e.g., RAN frame timing associated with transmission or reception of the RF signals or RF signal reflections), and thus wireless node 705 may combine RF signal metrics from other RF signal receivers (e.g., different wireless nodes) coherently. In some aspects, wireless node 705 may identify or otherwise determine the properties of the object based on the RF signal metrics and positioning information of wireless node 705. At 760, wireless node 705 may provide a sensing reporting to SnMF 710.

As shown in the two options, 780-a and 780-b, the sensing computation may be done at SnMF 710, a RAN node such as wireless node 705, or at both SnMF 710 and wireless node 705. In network-based sensing computation, SnMF 710 may collect measurements from one or more RAN nodes, such as wireless node 705. The sensing-related measurements for process 700 may include range, doppler, or angle maps (for each feature, quantized values may be reported or only values above a certain threshold may be reported), a use-case dependent function of in phase and quadrature phase (IQ) samples (e.g., some use-cases may only be interested in range values), and the like. In some examples, the sensing-related measurements may be dependent on the radio system design of the RAN node.

In some examples, the computational functions of SnMF 710 may be offloaded to a SnMC. The SnMC may collect sensing measurements from the involved RAN nodes and perform the sensing computation. The SnMC may then report the sensing results to SnMF 710. In some examples, an LMC may perform the sensing computation and report it to SnMF 710.

Regardless of which node or functionality determines the object properties, at 765, SnMF 710 may transmit, convey, or otherwise provide (and AF 715 may receive, identify, or otherwise obtain) an indication of the properties of the object. In some aspects, SnMF 710 may provide the indication of the properties of the object to AF 715 directly or via an AMF within the core network.

In some aspects, SnMF 710 may provide the indication of the properties of the object in response to a sensing query received from AF 715, such as the sensing query at 720. For example, AF 715 may receive or otherwise obtain a mapping request from one or more applications associated with SnMF 710. In response, AF 715 may transmit, convey, or otherwise provide the sensing query to SnMF 710. The sensing query may convey a request for properties of object(s) for which SnMF 710 has received RF signal metrics. Accordingly, SnMF 710 may obtain the RF signal metrics from wireless node 705 (and/or any other wireless nodes within the RAN), determine the properties of the object(s) based on the RF signal metrics, and then convey the indication of the properties of the object to AF 715 in response to the sensing query.

At 770, AF 715 may identify or otherwise determine spatial or mapping information for the object(s) based on the properties provided by SnMF 710. For example, AF 710 may identify or otherwise determine environmental mapping, geographical mapping, object mapping, and the like, for the object(s) based on the properties.

Figure 8:
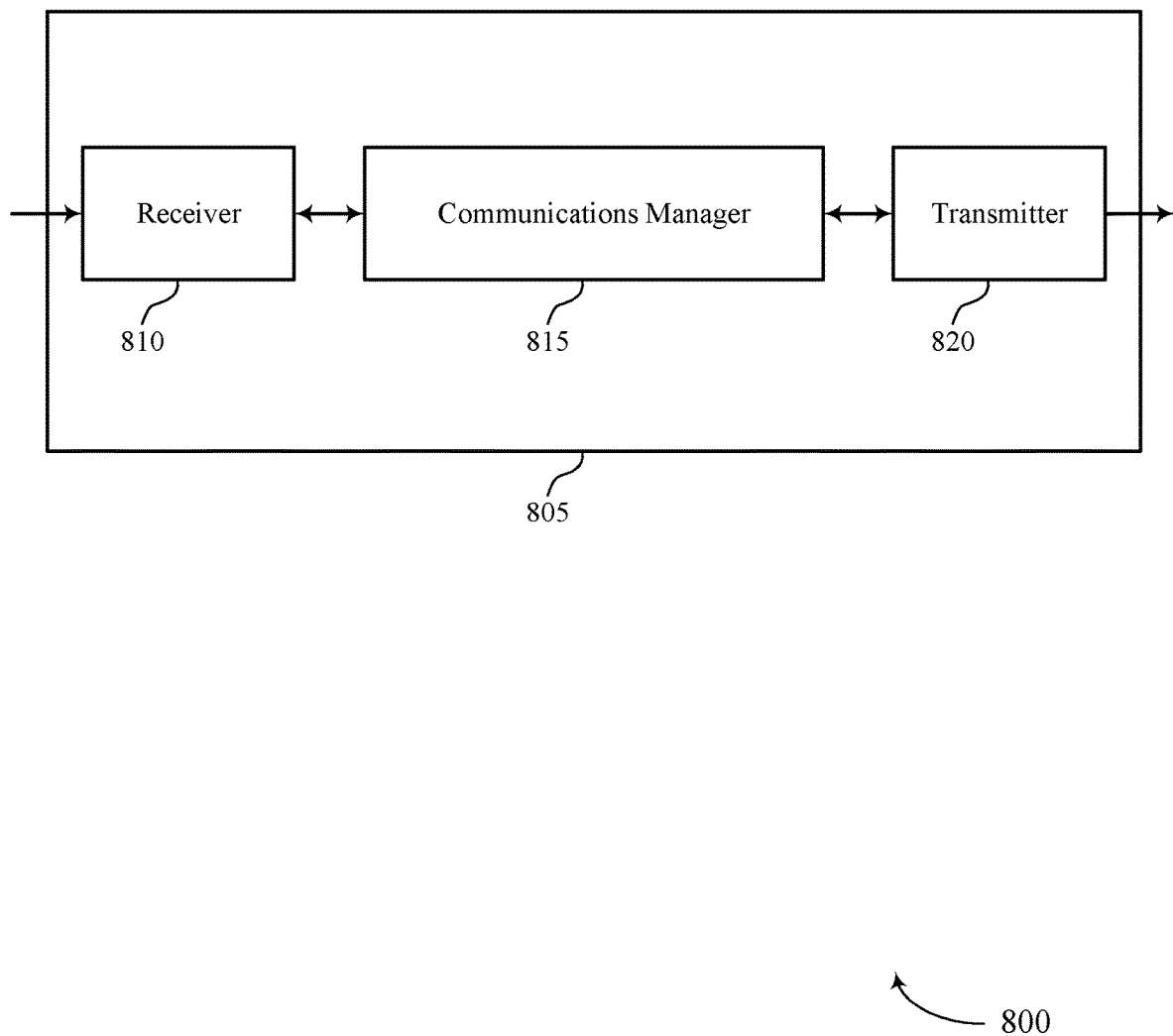
FIGS. 8 and 9 show block diagrams of devices that support architecture options for cooperative sensing and positioning in accordance with aspects of the present disclosure.

FIG. 8 shows a block diagram 800 of a device 805 that supports architecture options for cooperative sensing and positioning in accordance with aspects of the present disclosure. The device 805 may be an example of aspects of a UE 115 or base station 105 as described herein. The device 805 may include a receiver 810, a communications manager 815, and a transmitter 820. The device 805 may also include a processor. Each of these components may be in communication with one another (e.g., via one or more buses).

Receiver 810 may receive information such as packets, user data, or control information associated with various information channels (e.g., control channels, data channels, and information related to architecture options for cooperative sensing and positioning, etc.). Information may be passed on to other components of the device 805. The receiver 810 may be an example of aspects of the transceiver 1120 or 1220 as described with reference to FIGS. 11 and 12. The receiver 810 may utilize a single antenna or a set of antennas.

The communications manager 815 may obtain, from a network entity of a core network associated with the RAN and for each object of a set of objects, a sensing query for RF signal metrics associated with reflection off of each object of RF signal transmissions associated with the RAN, obtain, from one or more wireless nodes of the RAN, the RF signal metrics, and provide, to the network entity, the RF signal metrics. The communications manager 815 may be an example of aspects of the communications manager 1110 or 1210 as described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 820 may transmit signals generated by other components of the device 805. In some examples, the transmitter 820 may be collocated with a receiver 810 in a transceiver module. For example, the transmitter 820 may be an example of aspects of the transceiver 1120 or 1220 as described with reference to FIGS. 11 and 12. The transmitter 820 may utilize a single antenna or a set of antennas.

Figure 9:
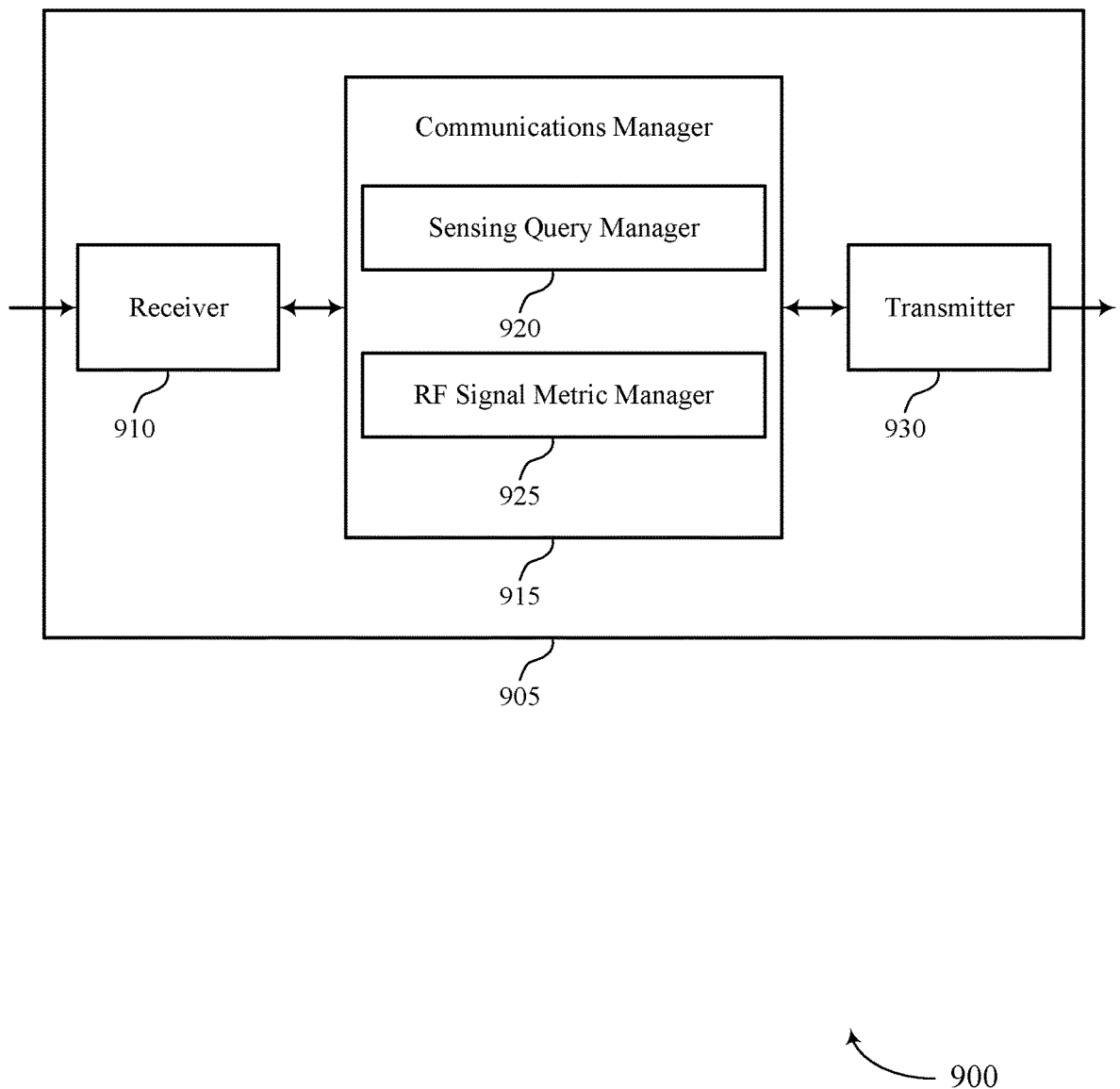

FIG. 9 shows a block diagram 900 of a device 905 that supports architecture options for cooperative sensing and positioning in accordance with aspects of the present disclosure. The device 905 may be an example of aspects of a device 805, a UE 115, or a base station 105 as described herein. The device 905 may include a receiver 910, a communications manager 915, and a transmitter 930. The device 905 may also include a processor. Each of these components may be in communication with one another (e.g., via one or more buses).

Receiver 910 may receive information such as packets, user data, or control information associated with various information channels (e.g., control channels, data channels, and information related to architecture options for cooperative sensing and positioning, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas.

The communications manager 915 may be an example of aspects of the communications manager 815 as described herein. The communications manager 915 may include a sensing query manager 920 and a RF signal metric manager 925. The communications manager 915 may be an example of aspects of the communications manager 1110 or 1210 as described herein.

The sensing query manager 920 may obtain, from a network entity of a core network associated with the RAN and for each object of a set of objects, a sensing query for RF signal metrics associated with reflection off of each object of RF signal transmissions associated with the RAN.

The RF signal metric manager 925 may obtain, from one or more wireless nodes of the RAN, the RF signal metrics and provide, to the network entity, the RF signal metrics.

Transmitter 930 may transmit signals generated by other components of the device 905. In some examples, the transmitter 930 may be collocated with a receiver 910 in a transceiver module. For example, the transmitter 930 may be an example of aspects of the transceiver 1120 or 1220 as described with reference to FIGS. 11 and 12. The transmitter 930 may utilize a single antenna or a set of antennas.

Figure 10:
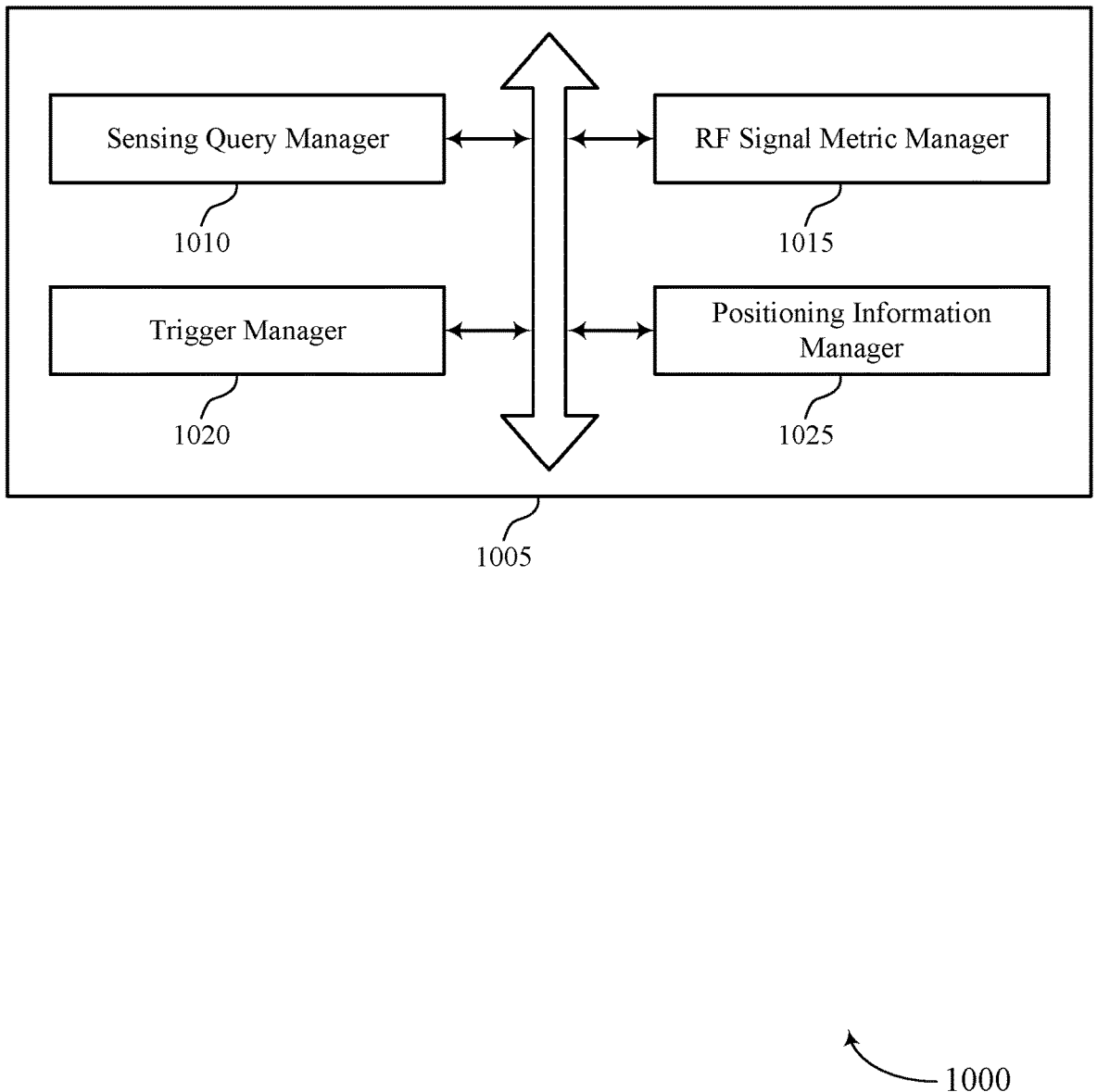
FIG. 10 shows a block diagram of a communications manager that supports architecture options for cooperative sensing and positioning in accordance with aspects of the present disclosure.

FIG. 10 shows a block diagram 1000 of a communications manager 1005 that supports architecture options for cooperative sensing and positioning in accordance with aspects of the present disclosure. The communications manager 1005 may be an example of aspects of a communications manager 815, a communications manager 915, or a communications manager 1110 described herein. The communications manager 1005 may include a sensing query manager 1010, a RF signal metric manager 1015, a trigger manager 1020, and a positioning information manager 1025. Each of these modules may communicate, directly or indirectly, with one another (e.g., via one or more buses).

The sensing query manager 1010 may obtain, from a network entity of a core network associated with the RAN and for each object of a set of objects, a sensing query for RF signal metrics associated with reflection off of each object of RF signal transmissions associated with the RAN. In some cases, the component of the RAN includes a sensing management component of the RAN. In some cases, the component of the RAN includes a logical component implemented in wireless nodes of the RAN.

The RF signal metric manager 1015 may obtain, from one or more wireless nodes of the RAN, the RF signal metrics. In some examples, the RF signal metric manager 1015 may provide, to the network entity, the RF signal metrics.

The trigger manager 1020 may provide, to each of the one or more wireless nodes of the RAN, a signal triggering RF signal transmissions, where the RF signal metrics are obtained based on the signal.

The positioning information manager 1025 may obtain, from a location management component of the RAN, positioning information associated with the one or more wireless nodes, the object, or both. In some examples, the positioning information manager 1025 may provide the positioning information with the RF signal metrics to the network entity.

Figure 11:
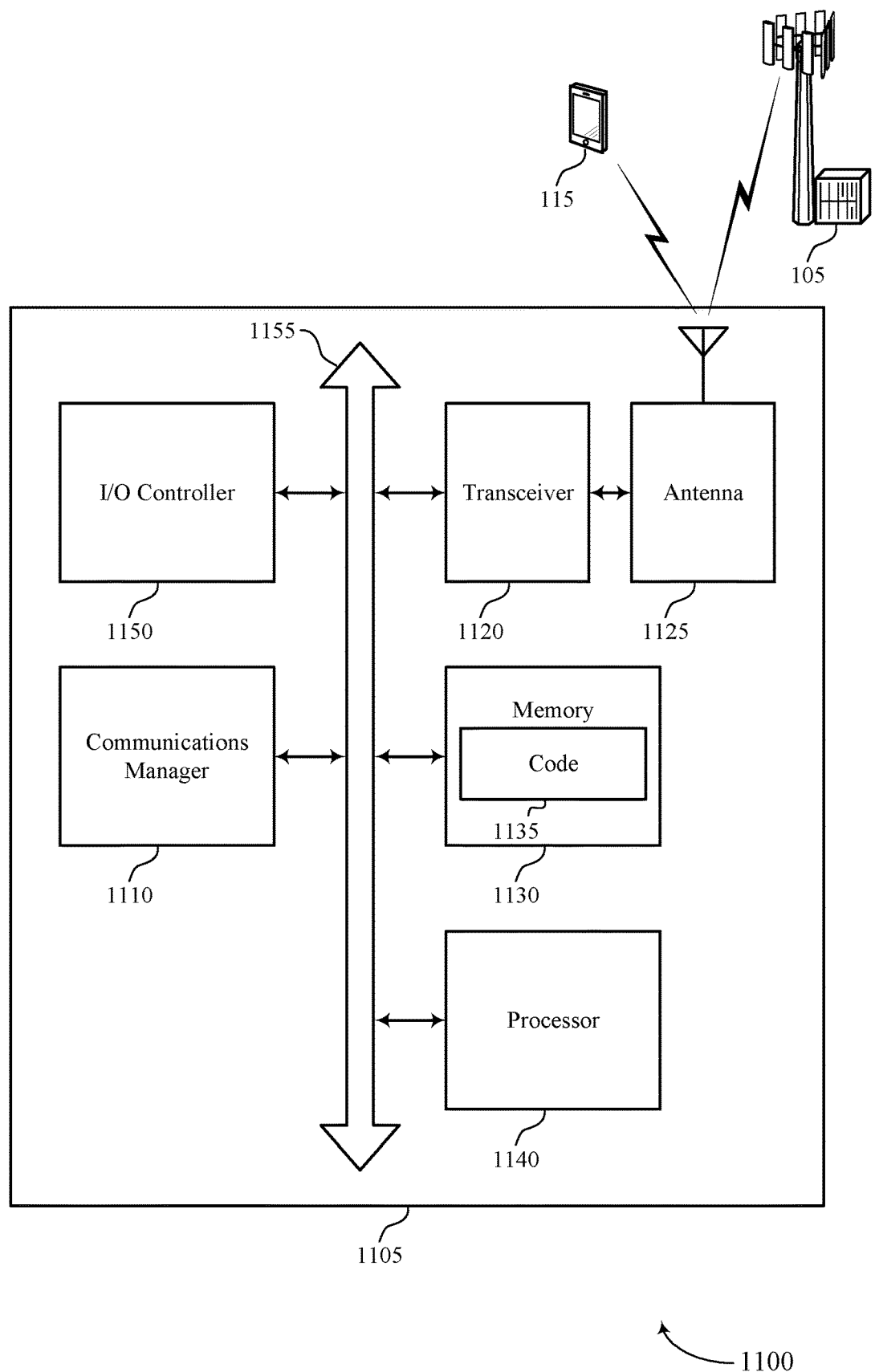
FIG. 11 shows a diagram of a system including a user equipment (UE) that supports architecture options for cooperative sensing and positioning in accordance with aspects of the present disclosure.

FIG. 11 shows a diagram of a system 1100 including a device 1105 that supports architecture options for cooperative sensing and positioning in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, a transceiver 1120, an antenna 1125, memory 1130, a processor 1140, and an I/O controller 1150. These components may be in electronic communication via one or more buses (e.g., bus 1155).

The communications manager 1110 may obtain, from a network entity of a core network associated with the RAN and for each object of a set of objects, a sensing query for RF signal metrics associated with reflection off of each object of RF signal transmissions associated with the RAN, obtain, from one or more wireless nodes of the RAN, the RF signal metrics, and provide, to the network entity, the RF signal metrics.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM), read-only memory (ROM), or a combination thereof. The memory 1130 may store computer-readable code 1135 including instructions that, when executed by a processor (e.g., the processor 1140) cause the device to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting architecture options for cooperative sensing and positioning).

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
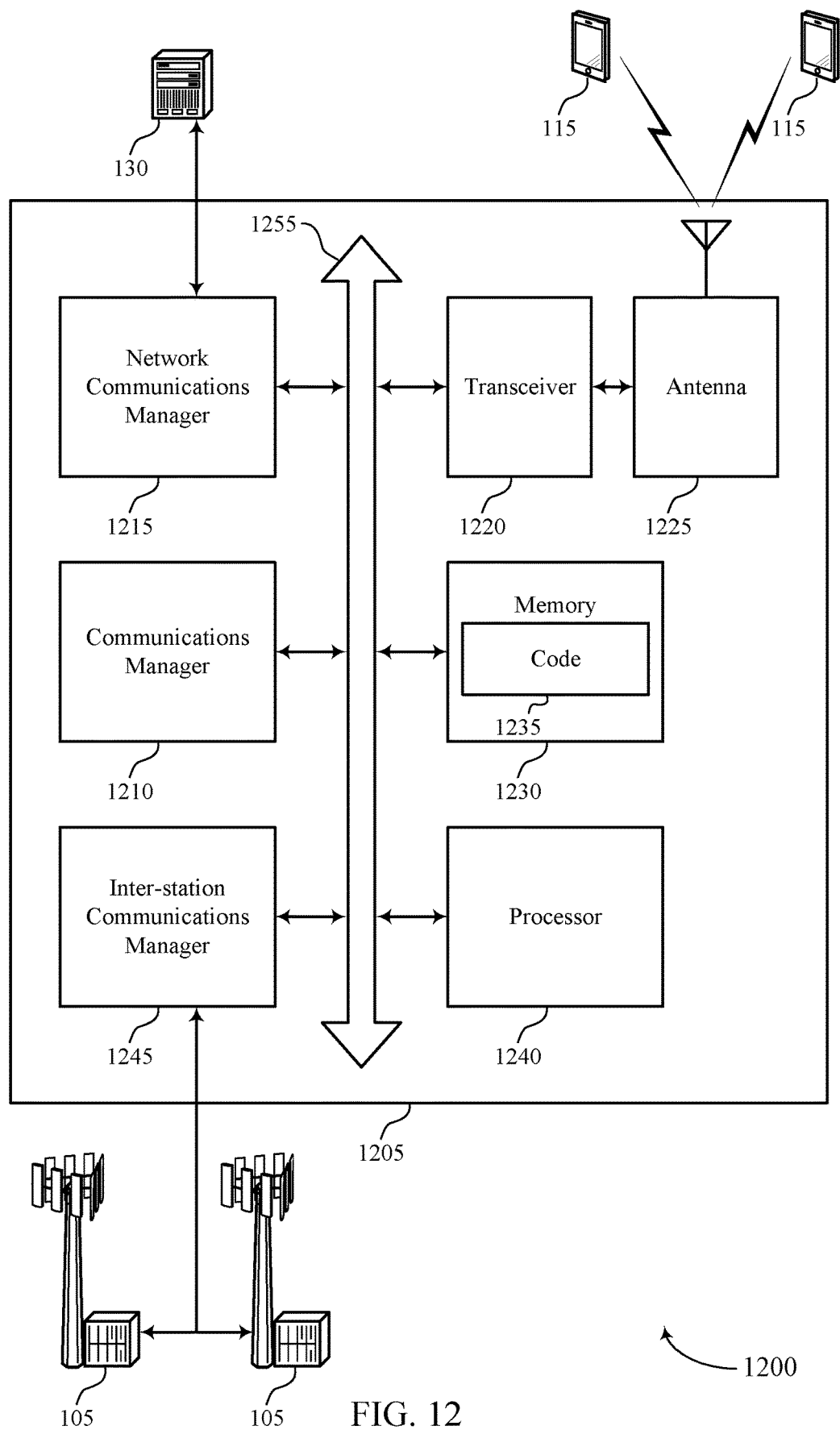
FIG. 12 shows a diagram of a system including a base station that supports architecture options for cooperative sensing and positioning in accordance with aspects of the present disclosure.

FIG. 12 shows a diagram of a system 1200 including a device 1205 that supports architecture options for cooperative sensing and positioning in accordance with aspects of the present disclosure. The device 1205 may be an example of or include the components of device 805, device 905, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1255).

The communications manager 1210 may obtain, from a network entity of a core network associated with the RAN and for each object of a set of objects, a sensing query for RF signal metrics associated with reflection off of each object of RF signal transmissions associated with the RAN, obtain, from one or more wireless nodes of the RAN, the RF signal metrics, and provide, to the network entity, the RF signal metrics.

Network communications manager 1215 may manage communications with the core network (e.g., via one or more wired backhaul links). For example, the network communications manager 1215 may manage the transfer of data communications for client devices, such as one or more UEs 115.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting architecture options for cooperative sensing and positioning).

Inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
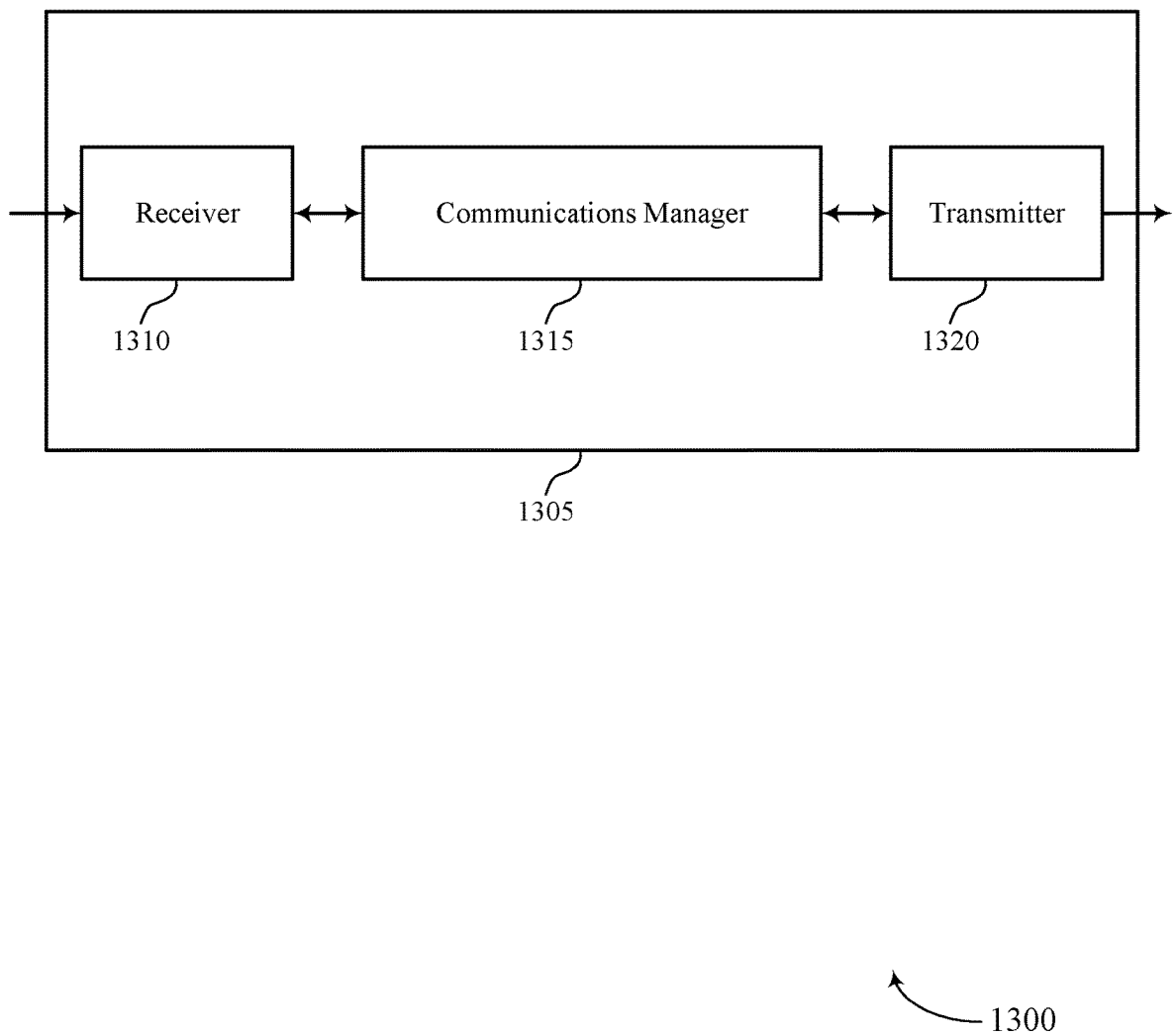
FIGS. 13 and 14 show block diagrams of devices that support architecture options for cooperative sensing and positioning in accordance with aspects of the present disclosure.

FIG. 13 shows a block diagram 1300 of a device 1305 that supports architecture options for cooperative sensing and positioning in accordance with aspects of the present disclosure. The device 1305 may be an example of aspects of a network entity as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to architecture options for cooperative sensing and positioning, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may obtain, from one or more wireless nodes of a RAN associated with the core network, RF signal metrics associated with reflection off of an object of RF signal transmissions associated with the RAN, determine, based on the RF signal metrics, one or more properties of the object, and provide, to a second network entity of the core network that is different than the first network entity, an indication of the one or more properties of the object. The communications manager 1315 may also provide, to a second network entity of the core network different from the first network entity, a sensing query for one or more properties corresponding to each object of a set of objects, obtain, from the second network entity of the core network and for each object of the set of objects, the one or more properties of the object, and determine, based on the one or more properties, mapping information for the set of objects. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
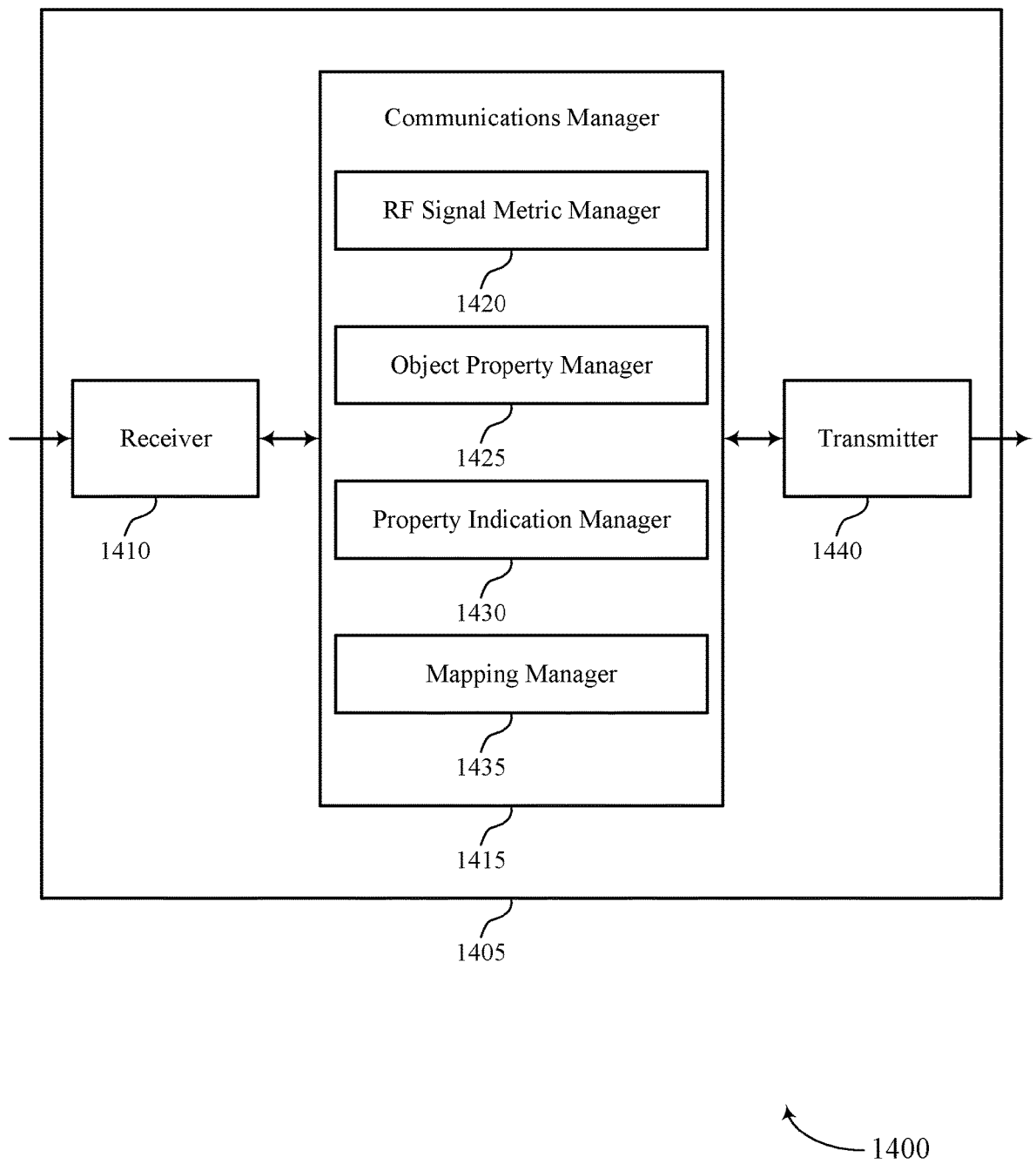

FIG. 14 shows a block diagram 1400 of a device 1405 that supports architecture options for cooperative sensing and positioning in accordance with aspects of the present disclosure. The device 1405 may be an example of aspects of a device 1305 or a network entity 115 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to architecture options for cooperative sensing and positioning, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a RF signal metric manager 1420, an object property manager 1425, a property indication manager 1430, and a mapping manager 1435. The communications manager 1415 may be an example of aspects of the communications manager 1610 described herein.

The RF signal metric manager 1420 may obtain, from one or more wireless nodes of a RAN associated with the core network, RF signal metrics associated with reflection off of an object of RF signal transmissions associated with the RAN.

The object property manager 1425 may determine, based on the RF signal metrics, one or more properties of the object.

The property indication manager 1430 may provide, to a second network entity of the core network that is different than the first network entity, an indication of the one or more properties of the object. The property indication manager 1430 may provide, to a second network entity of the core network different from the first network entity, a sensing query for one or more properties corresponding to each object of a set of objects.

The RF signal metric manager 1420 may obtain, from the second network entity of the core network and for each object of the set of objects, the one or more properties of the object.

The mapping manager 1435 may determine, based on the one or more properties, mapping information for the set of objects.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
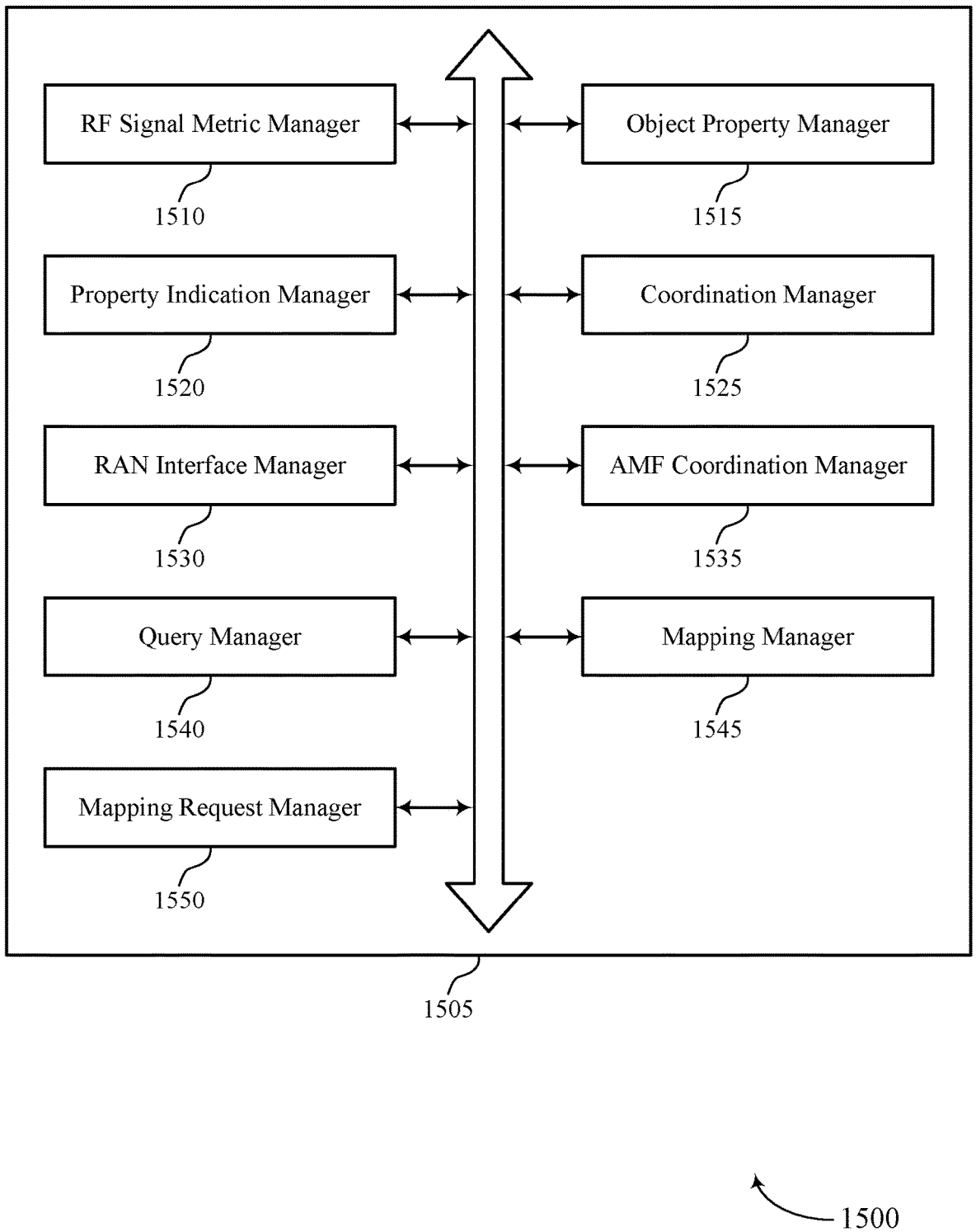
FIG. 15 shows a block diagram of a communications manager that supports architecture options for cooperative sensing and positioning in accordance with aspects of the present disclosure.

FIG. 15 shows a block diagram 1500 of a communications manager 1505 that supports architecture options for cooperative sensing and positioning in accordance with aspects of the present disclosure. The communications manager 1505 may be an example of aspects of a communications manager 1315, a communications manager 1415, or a communications manager 1610 described herein. The communications manager 1505 may include a RF signal metric manager 1510, an object property manager 1515, a property indication manager 1520, a coordination manager 1525, a RAN interface manager 1530, an AMF coordination manager 1535, a query manager 1540, a mapping manager 1545, and a mapping request manager 1550. Each of these modules may communicate, directly or indirectly, with one another (e.g., via one or more buses).

The RF signal metric manager 1510 may obtain, from one or more wireless nodes of a RAN associated with the core network, RF signal metrics associated with reflection off of an object of RF signal transmissions associated with the RAN. In some examples, the RF signal metric manager 1510 may obtain, from the second network entity of the core network and for each object of the set of objects, the one or more properties of the object. In some cases, the first network entity includes a sensing management function of the core network that operates to determine the one or more properties of the object separately from a location management function of the core network. In some cases, the first network entity includes a sensing management function of the core network and the second network entity includes an application layer entity of the core network. In some cases, the first network entity includes an application layer entity of the core network and the second network entity includes a sensing management function of the core network.

The object property manager 1515 may determine, based on the RF signal metrics, one or more properties of the object.

The property indication manager 1520 may provide, to a second network entity of the core network that is different than the first network entity, an indication of the one or more properties of the object. In some examples, the property indication manager 1520 may provide, to a second network entity of the core network different from the first network entity, a sensing query for one or more properties corresponding to each object of a set of objects.

The mapping manager 1545 may determine, based on the one or more properties, mapping information for the set of objects.

The coordination manager 1525 may obtain, from a location management function of the core network, positioning information associated with the one or more wireless nodes, the object, or both, where determining the one or more properties of the object is based on the positioning information. In some examples, the coordination manager 1525 may obtain the positioning information via an interface established between first network entity and the location management function. In some cases, the first network entity and the location management function include a combined network entity of the core network.

The RAN interface manager 1530 may obtain the RF signal metrics from a sensing management component of the RAN. In some cases, the sensing management component of the RAN operates separately from a location management function of the core network to determine the one or more properties of the object. In some cases, the sensing management component of the RAN includes a combined RAN component that is combined with a location management component of the RAN.

The AMF coordination manager 1535 may provide the indication of the one or more properties of the object to the second network entity via a third network entity of the core network that is different from the first network entity and the second network entity. In some cases, the third network entity includes an access management function of the core network.

The query manager 1540 may obtain, from the second network entity of the core network, a sensing query for the one or more properties corresponding to each object of a set of objects, where the indication of the one or more properties is provided based on the sensing query. In some examples, the query manager 1540 may provide, to a third network entity of the core network, the sensing query for forwarding to the second network entity from the third network entity. In some examples, the query manager 1540 may obtain, from the third network entity of the core network, the one or more properties of the object forwarded from the second network entity. In some cases, the third network entity includes an access management function of the core network.

The mapping request manager 1550 may obtain a mapping request from one or more applications associated with the first network entity, where the sensing query is provided based on the mapping request.

Figure 16:
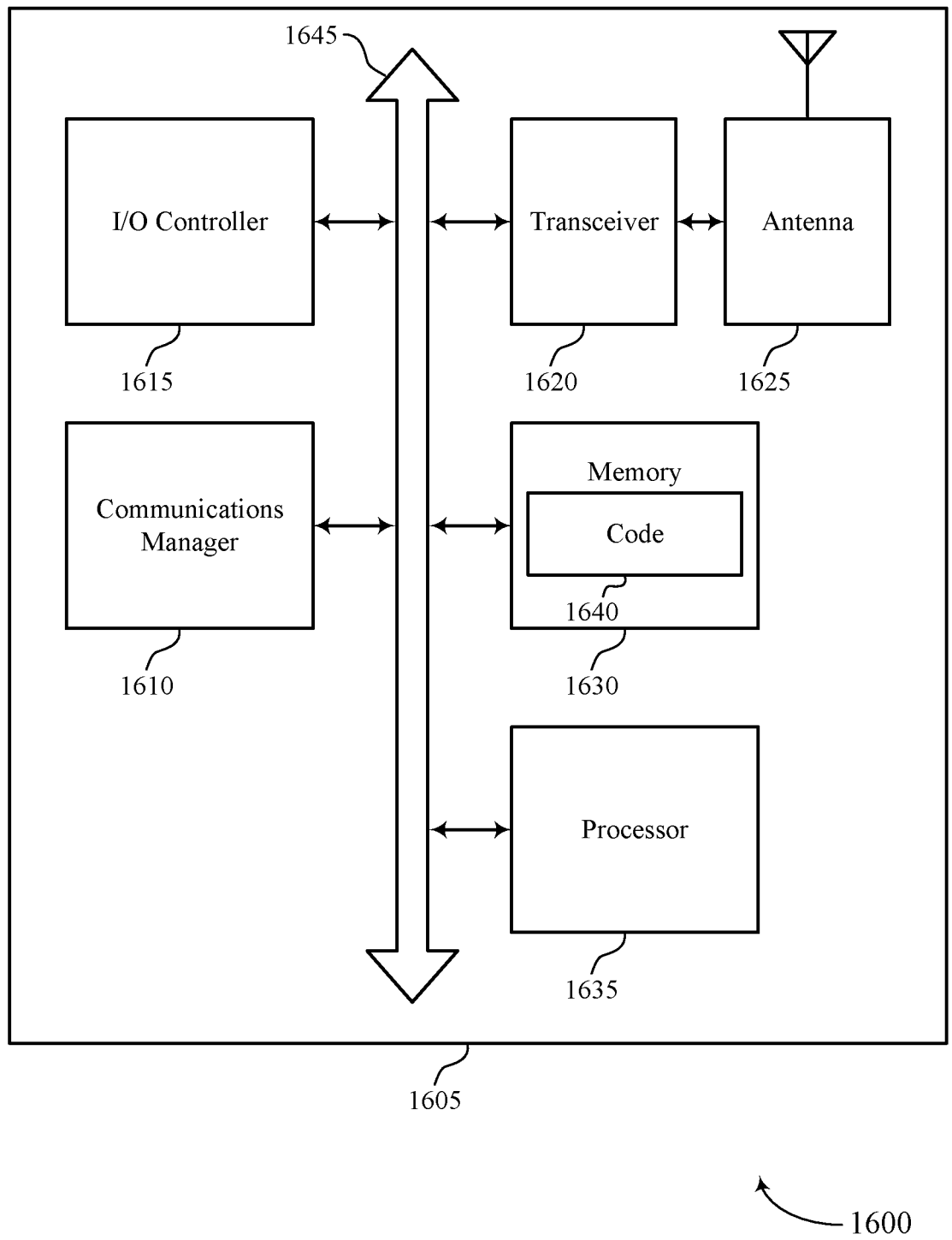
FIG. 16 shows a diagram of a system including a device that supports architecture options for cooperative sensing and positioning in accordance with aspects of the present disclosure.

FIG. 16 shows a diagram of a system 1600 including a device 1605 that supports architecture options for cooperative sensing and positioning in accordance with aspects of the present disclosure. The device 1605 may be an example of or include the components of device 1305, device 1405, or a network entity as described herein. The device 1605 may include components for bi-directional voice and data communications including components for transmitting and receiving communications, including a communications manager 1610, an I/O controller 1615, a transceiver 1620, an antenna 1625, memory 1630, and a processor 1635. These components may be in electronic communication via one or more buses (e.g., bus 1645).

The communications manager 1610 may obtain, from one or more wireless nodes of a RAN associated with the core network, RF signal metrics associated with reflection off of an object of RF signal transmissions associated with the RAN, determine, based on the RF signal metrics, one or more properties of the object, and provide, to a second network entity of the core network that is different than the first network entity, an indication of the one or more properties of the object. The communications manager 1610 may also provide, to a second network entity of the core network different from the first network entity, a sensing query for one or more properties corresponding to each object of a set of objects, obtain, from the second network entity of the core network and for each object of the set of objects, the one or more properties of the object, and determine, based on the one or more properties, mapping information for the set of objects.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM and ROM. The memory 1630 may store computer-readable, computer-executable code 1640 including instructions that, when executed, cause the processor to perform various functions described herein. In some cases, the memory 1630 may contain, among other things, a BIOS which may control basic hardware or software operation such as the interaction with peripheral components or devices.

The processor 1635 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1635 may be configured to operate a memory array using a memory controller. In other cases, a memory controller may be integrated into the processor 1635. The processor 1635 may be configured to execute computer-readable instructions stored in a memory (e.g., the memory 1630) to cause the device 1605 to perform various functions (e.g., functions or tasks supporting architecture options for cooperative sensing and positioning).

The code 1640 may include instructions to implement aspects of the present disclosure, including instructions to support wireless communications. The code 1640 may be stored in a non-transitory computer-readable medium such as system memory or other type of memory. In some cases, the code 1640 may not be directly executable by the processor 1635 but may cause a computer (e.g., when compiled and executed) to perform functions described herein.

Figure 17:
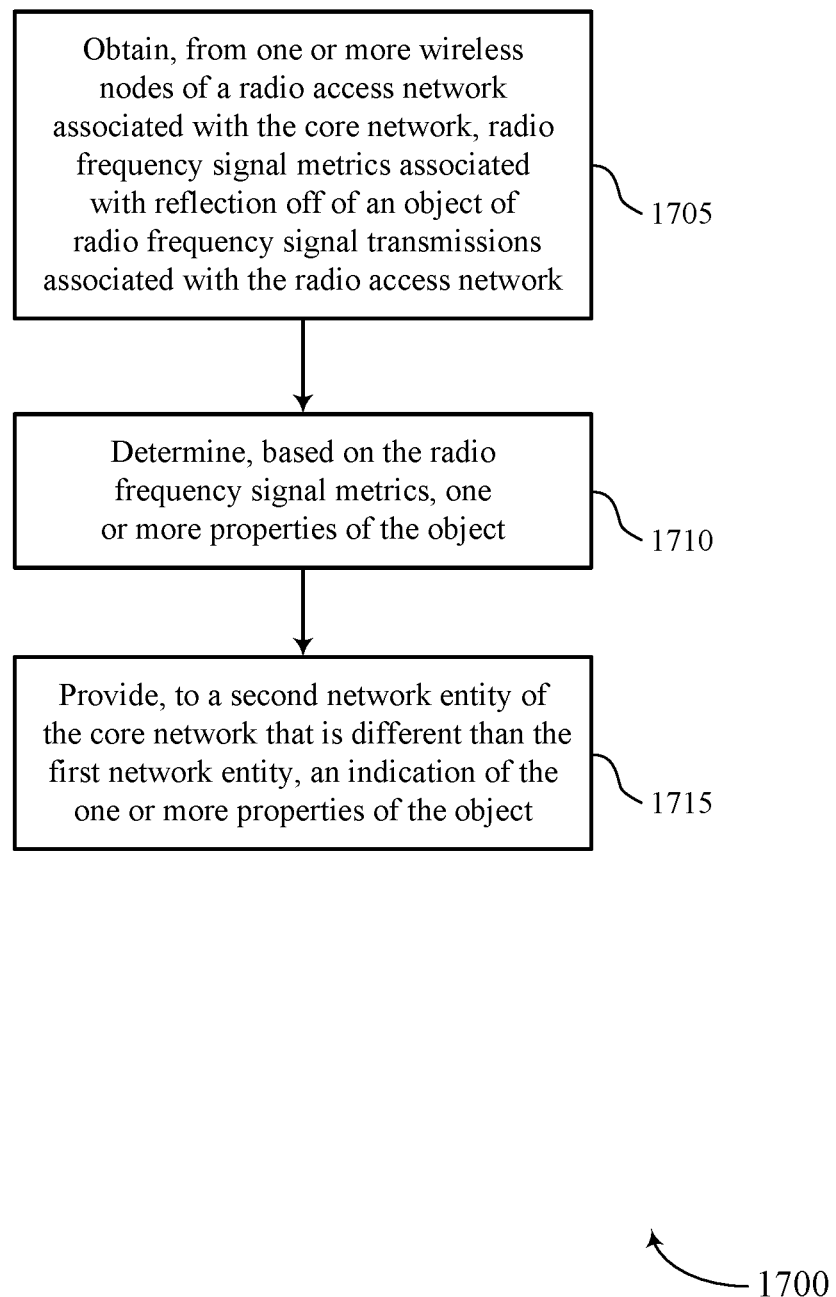
FIGS. 17 through 22 show flowcharts illustrating methods that support architecture options for cooperative sensing and positioning in accordance with aspects of the present disclosure.

FIG. 17 shows a flowchart illustrating a method 1700 that supports architecture options for cooperative sensing and positioning in accordance with aspects of the present disclosure. The operations of method 1700 may be implemented by a network entity or its components as described herein. For example, the operations of method 1700 may be performed by a communications manager as described with reference to FIGS. 13 through 16. In some examples, a network entity may execute a set of instructions to control the functional elements of the network entity to perform the functions described below. Additionally, or alternatively, a network entity may perform aspects of the functions described below using special-purpose hardware.

At 1705, the network entity may obtain, from one or more wireless nodes of a RAN associated with the core network, RF signal metrics associated with reflection off of an object of RF signal transmissions associated with the RAN. The operations of 1705 may be performed according to the methods described herein. In some examples, aspects of the operations of 1705 may be performed by a RF signal metric manager as described with reference to FIGS. 13 through 16.

At 1710, the network entity may determine, based on the RF signal metrics, one or more properties of the object. The operations of 1710 may be performed according to the methods described herein. In some examples, aspects of the operations of 1710 may be performed by an object property manager as described with reference to FIGS. 13 through 16.

At 1715, the network entity may provide, to a second network entity of the core network that is different than the first network entity, an indication of the one or more properties of the object. The operations of 1715 may be performed according to the methods described herein. In some examples, aspects of the operations of 1715 may be performed by a property indication manager as described with reference to FIGS. 13 through 16.

Figure 18:
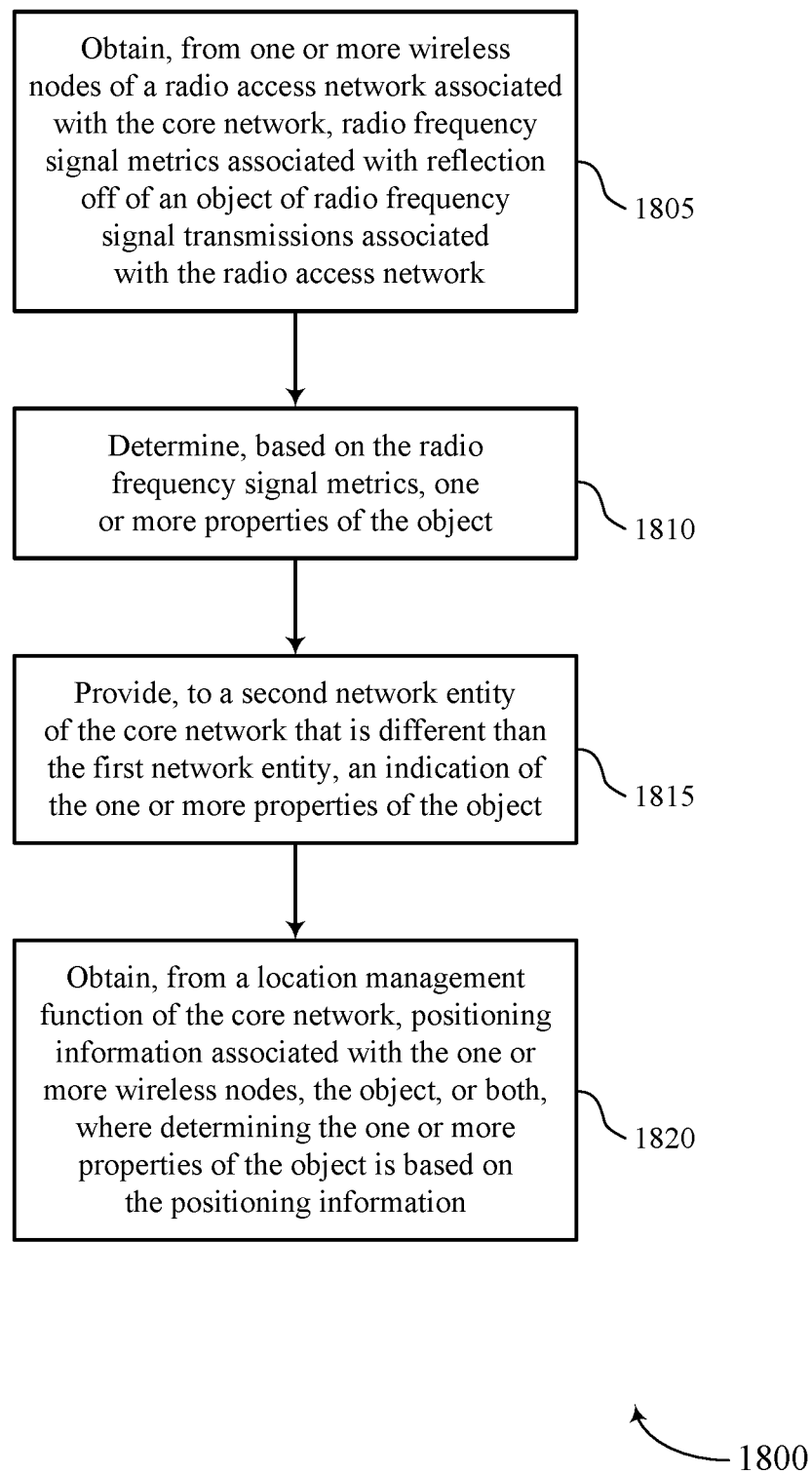

FIG. 18 shows a flowchart illustrating a method 1800 that supports architecture options for cooperative sensing and positioning in accordance with aspects of the present disclosure. The operations of method 1800 may be implemented by a network entity or its components as described herein. For example, the operations of method 1800 may be performed by a communications manager as described with reference to FIGS. 13 through 16. In some examples, a network entity may execute a set of instructions to control the functional elements of the network entity to perform the functions described below. Additionally, or alternatively, a network entity may perform aspects of the functions described below using special-purpose hardware.

At 1805, the network entity may obtain, from one or more wireless nodes of a RAN associated with the core network, RF signal metrics associated with reflection off of an object of RF signal transmissions associated with the RAN. The operations of 1805 may be performed according to the methods described herein. In some examples, aspects of the operations of 1805 may be performed by a RF signal metric manager as described with reference to FIGS. 13 through 16.

At 1810, the network entity may determine, based on the RF signal metrics, one or more properties of the object. The operations of 1810 may be performed according to the methods described herein. In some examples, aspects of the operations of 1810 may be performed by an object property manager as described with reference to FIGS. 13 through 16.

At 1815, the network entity may provide, to a second network entity of the core network that is different than the first network entity, an indication of the one or more properties of the object. The operations of 1815 may be performed according to the methods described herein. In some examples, aspects of the operations of 1815 may be performed by a property indication manager as described with reference to FIGS. 13 through 16.

At 1820, the network entity may obtain, from a location management function of the core network, positioning information associated with the one or more wireless nodes, the object, or both, where determining the one or more properties of the object is based on the positioning information. The operations of 1820 may be performed according to the methods described herein. In some examples, aspects of the operations of 1820 may be performed by a coordination manager as described with reference to FIGS. 13 through 16.

Figure 19:
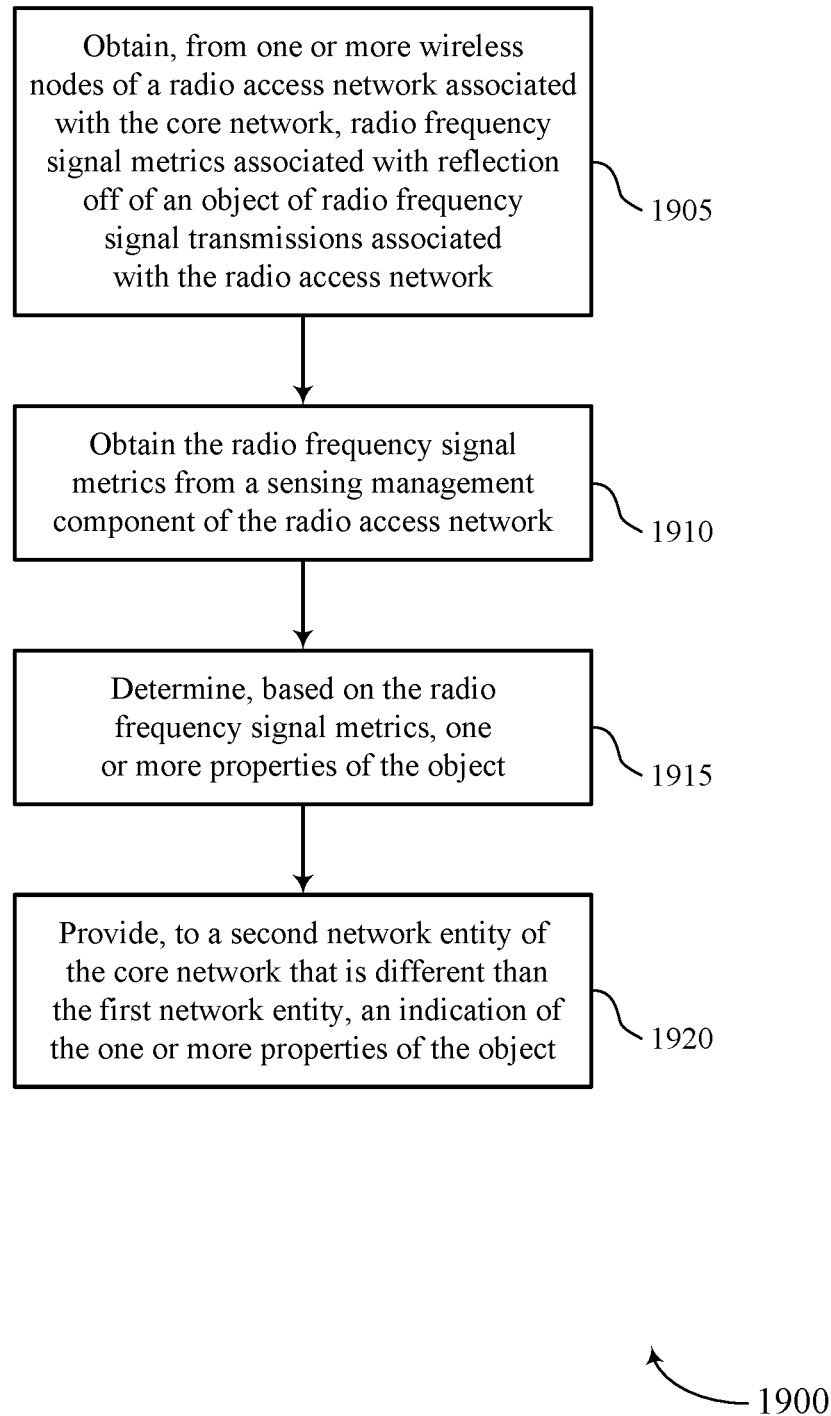

FIG. 19 shows a flowchart illustrating a method 1900 that supports architecture options for cooperative sensing and positioning in accordance with aspects of the present disclosure. The operations of method 1900 may be implemented by a network entity or its components as described herein. For example, the operations of method 1900 may be performed by a communications manager as described with reference to FIGS. 13 through 16. In some examples, a network entity may execute a set of instructions to control the functional elements of the network entity to perform the functions described below. Additionally, or alternatively, a network entity may perform aspects of the functions described below using special-purpose hardware.

At 1905, the network entity may obtain, from one or more wireless nodes of a RAN associated with the core network, RF signal metrics associated with reflection off of an object of RF signal transmissions associated with the RAN. The operations of 1905 may be performed according to the methods described herein. In some examples, aspects of the operations of 1905 may be performed by a RF signal metric manager as described with reference to FIGS. 13 through 16.

At 1910, the network entity may obtain the RF signal metrics from a sensing management component of the RAN. The operations of 1910 may be performed according to the methods described herein. In some examples, aspects of the operations of 1910 may be performed by a RAN interface manager as described with reference to FIGS. 13 through 16.

At 1915, the network entity may determine, based on the RF signal metrics, one or more properties of the object. The operations of 1915 may be performed according to the methods described herein. In some examples, aspects of the operations of 1915 may be performed by an object property manager as described with reference to FIGS. 13 through 16.

At 1920, the network entity may provide, to a second network entity of the core network that is different than the first network entity, an indication of the one or more properties of the object. The operations of 1920 may be performed according to the methods described herein. In some examples, aspects of the operations of 1920 may be performed by a property indication manager as described with reference to FIGS. 13 through 16.

Figure 20:
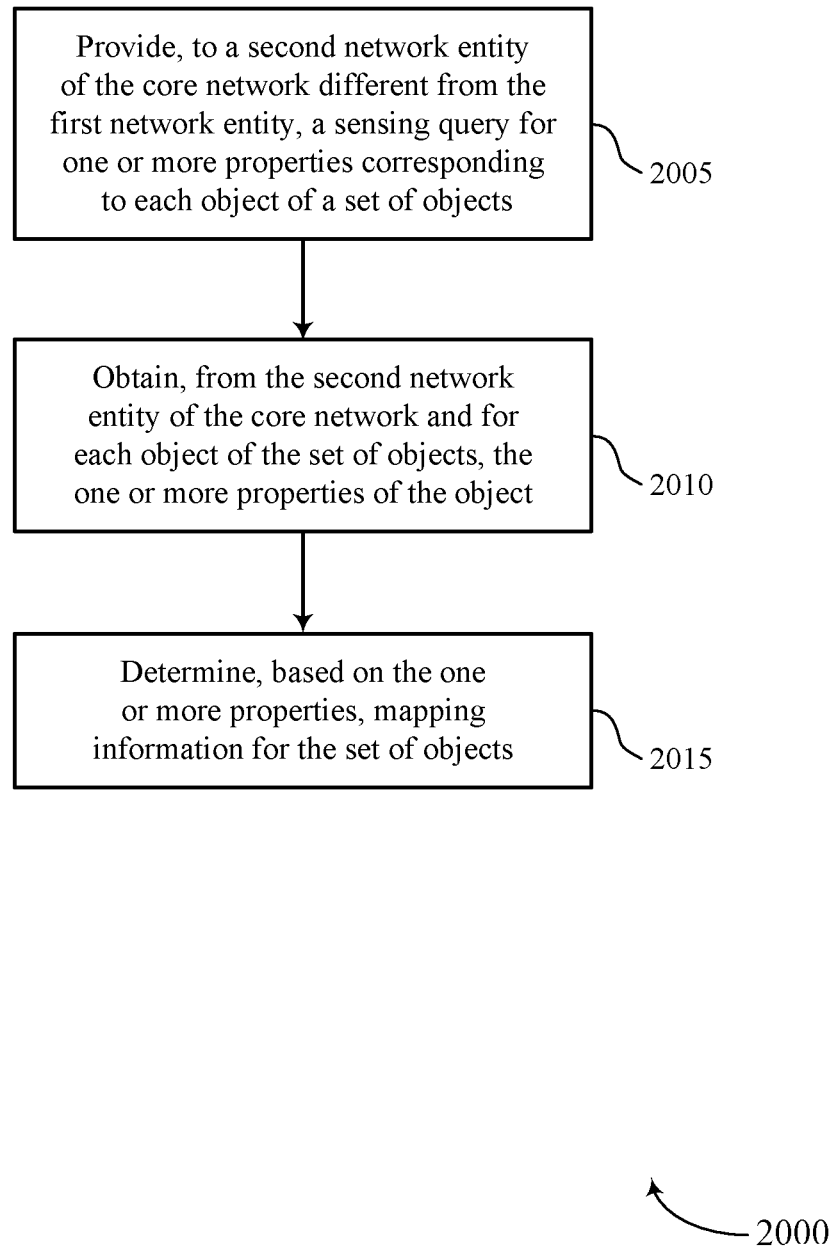

FIG. 20 shows a flowchart illustrating a method 2000 that supports architecture options for cooperative sensing and positioning in accordance with aspects of the present disclosure. The operations of method 2000 may be implemented by a network entity or its components as described herein. For example, the operations of method 2000 may be performed by a communications manager as described with reference to FIGS. 13 through 16. In some examples, a network entity may execute a set of instructions to control the functional elements of the network entity to perform the functions described below. Additionally, or alternatively, a network entity may perform aspects of the functions described below using special-purpose hardware.

At 2005, the network entity may provide, to a second network entity of the core network different from the first network entity, a sensing query for one or more properties corresponding to each object of a set of objects. The operations of 2005 may be performed according to the methods described herein. In some examples, aspects of the operations of 2005 may be performed by a property indication manager as described with reference to FIGS. 13 through 16.

At 2010, the network entity may obtain, from the second network entity of the core network and for each object of the set of objects, the one or more properties of the object. The operations of 2010 may be performed according to the methods described herein. In some examples, aspects of the operations of 2010 may be performed by a RF signal metric manager as described with reference to FIGS. 13 through 16.

At 2015, the network entity may determine, based on the one or more properties, mapping information for the set of objects. The operations of 2015 may be performed according to the methods described herein. In some examples, aspects of the operations of 2015 may be performed by a mapping manager as described with reference to FIGS. 13 through 16.

Figure 21:
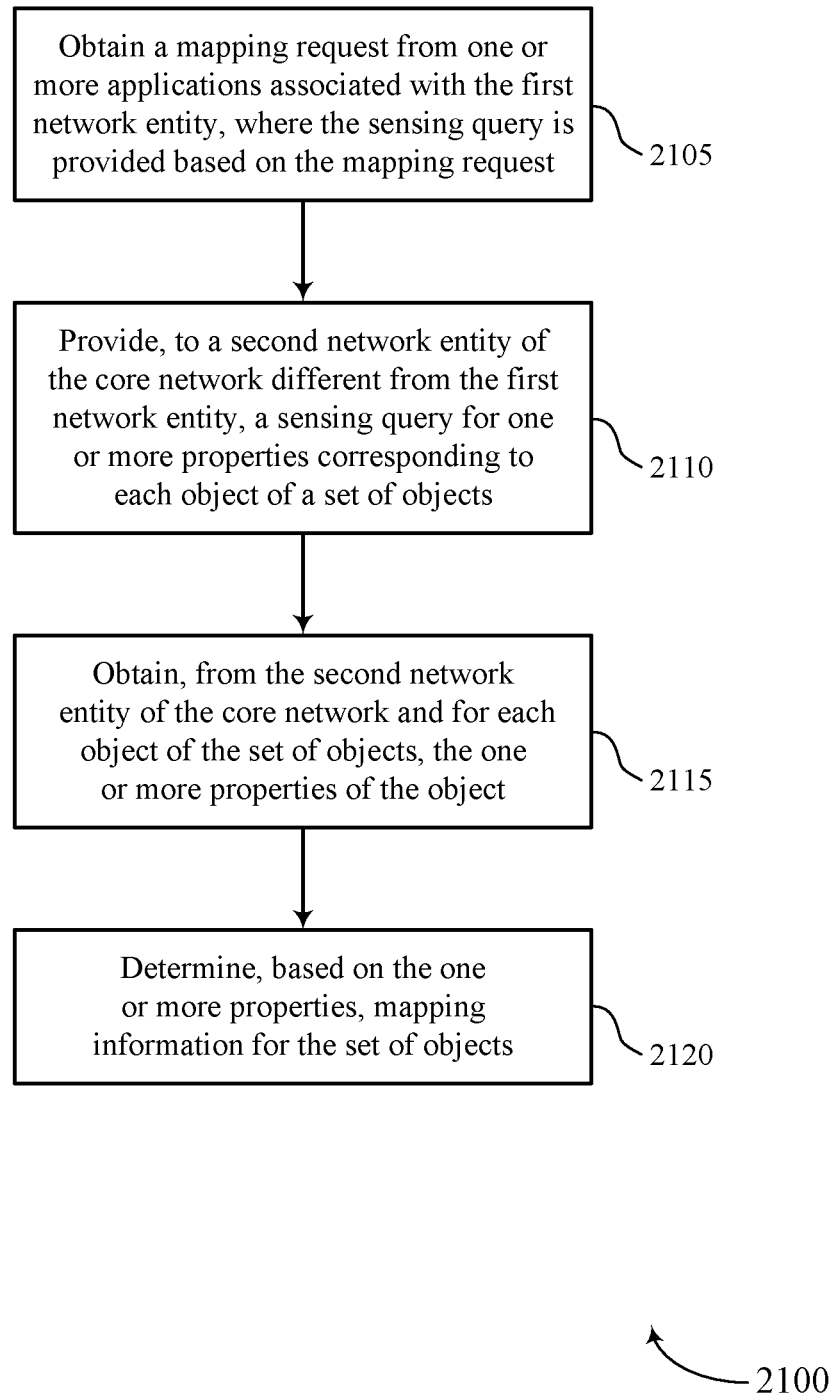

FIG. 21 shows a flowchart illustrating a method 2100 that supports architecture options for cooperative sensing and positioning in accordance with aspects of the present disclosure. The operations of method 2100 may be implemented by a network entity or its components as described herein. For example, the operations of method 2100 may be performed by a communications manager as described with reference to FIGS. 13 through 16. In some examples, a network entity may execute a set of instructions to control the functional elements of the network entity to perform the functions described below. Additionally, or alternatively, a network entity may perform aspects of the functions described below using special-purpose hardware.

At 2105, the network entity may obtain a mapping request from one or more applications associated with the first network entity, where the sensing query is provided based on the mapping request. The operations of 2105 may be performed according to the methods described herein. In some examples, aspects of the operations of 2105 may be performed by a mapping request manager as described with reference to FIGS. 13 through 16.

At 2110, the network entity may provide, to a second network entity of the core network different from the first network entity, a sensing query for one or more properties corresponding to each object of a set of objects. The operations of 2110 may be performed according to the methods described herein. In some examples, aspects of the operations of 2110 may be performed by a property indication manager as described with reference to FIGS. 13 through 16.

At 2115, the network entity may obtain, from the second network entity of the core network and for each object of the set of objects, the one or more properties of the object. The operations of 2115 may be performed according to the methods described herein. In some examples, aspects of the operations of 2115 may be performed by a RF signal metric manager as described with reference to FIGS. 13 through 16.

At 2120, the network entity may determine, based on the one or more properties, mapping information for the set of objects. The operations of 2120 may be performed according to the methods described herein. In some examples, aspects of the operations of 2120 may be performed by a mapping manager as described with reference to FIGS. 13 through 16.

Figure 22:
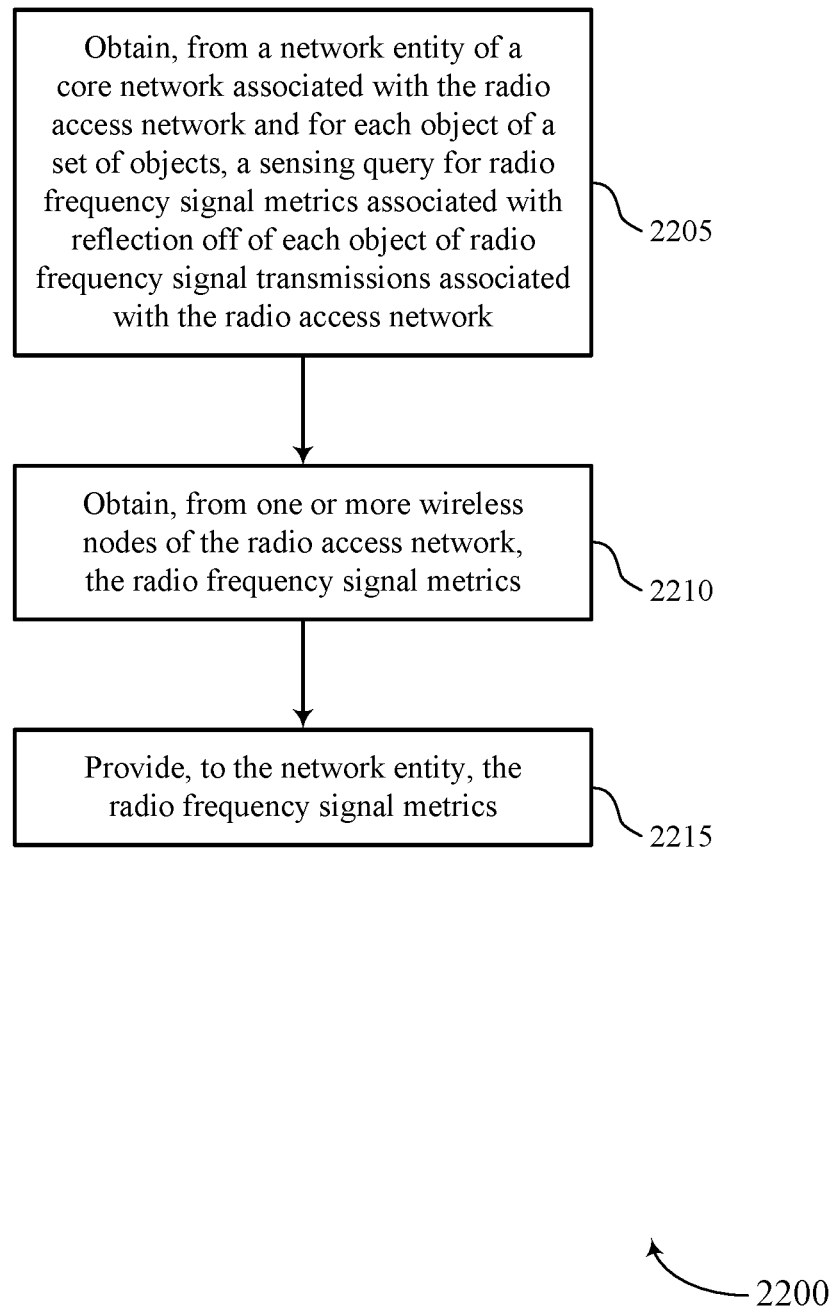

FIG. 22 shows a flowchart illustrating a method 2200 that supports architecture options for cooperative sensing and positioning in accordance with aspects of the present disclosure. The operations of method 2200 may be implemented by a UE 115 or base station 105 or its components as described herein. For example, the operations of method 2200 may be performed by a communications manager as described with reference to FIGS. 8 through 12. In some examples, a UE or base station may execute a set of instructions to control the functional elements of the UE or base station to perform the functions described below. Additionally, or alternatively, a UE or base station may perform aspects of the functions described below using special-purpose hardware.

At 2205, the UE or base station may obtain, from a network entity of a core network associated with the RAN and for each object of a set of objects, a sensing query for RF signal metrics associated with reflection off of each object of RF signal transmissions associated with the RAN. The operations of 2205 may be performed according to the methods described herein. In some examples, aspects of the operations of 2205 may be performed by a sensing query manager as described with reference to FIGS. 8 through 12.

At 2210, the UE or base station may obtain, from one or more wireless nodes of the RAN, the RF signal metrics. The operations of 2210 may be performed according to the methods described herein. In some examples, aspects of the operations of 2210 may be performed by a RF signal metric manager as described with reference to FIGS. 8 through 12.

At 2215, the UE or base station may provide, to the network entity, the RF signal metrics. The operations of 2215 may be performed according to the methods described herein. In some examples, aspects of the operations of 2215 may be performed by a RF signal metric manager as described with reference to FIGS. 8 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first network entity of a core network, comprising: obtaining, from one or more wireless nodes of a radio access network associated with the core network, radio frequency signal metrics associated with reflection off of an object of radio frequency signal transmissions associated with the radio access network; determining, based at least in part on the radio frequency signal metrics, one or more properties of the object; and providing, to a second network entity of the core network that is different than the first network entity, an indication of the one or more properties of the object.

Aspect 2: The method of aspect 1, further comprising: obtaining, from a location management function of the core network, positioning information associated with the one or more wireless nodes, the object, or both, wherein determining the one or more properties of the object is based at least in part on the positioning information.

Aspect 3: The method of aspect 2, wherein obtaining the positioning information comprises: obtaining the positioning information via an interface established between first network entity and the location management function.

Aspect 4: The method of any of aspects 2 through 3, wherein the first network entity and the location management function comprise a combined network entity of the core network.

Aspect 5: The method of any of aspects 1 through 4, wherein the first network entity comprises a sensing management function of the core network, further comprising: obtaining the radio frequency signal metrics from a sensing management component of the radio access network.

Aspect 6: The method of aspect 5, wherein the sensing management component of the radio access network operates separately from a location management function of the core network to determine the one or more properties of the object.

Aspect 7: The method of any of aspects 5 through 6, wherein the sensing management component of the radio access network comprises a combined radio access network component that is combined with a location management component of the radio access network.

Aspect 8: The method of any of aspects 1 through 7, further comprising: providing the indication of the one or more properties of the object to the second network entity via a third network entity of the core network that is different from the first network entity and the second network entity.

Aspect 9: The method of aspect 8, wherein the third network entity comprises an access management function of the core network.

Aspect 10: The method of any of aspects 1 through 9, further comprising: obtaining, from the second network entity of the core network, a sensing query for the one or more properties corresponding to each object of a plurality of objects, wherein the indication of the one or more properties is provided based at least in part on the sensing query.

Aspect 11: The method of any of aspects 1 through 10, wherein the first network entity comprises a sensing management function of the core network that operates to determine the one or more properties of the object separately from a location management function of the core network.

Aspect 12: The method of any of aspects 1 through 11, wherein the first network entity comprises a sensing management function of the core network and the second network entity comprises an application layer entity of the core network.

Aspect 13: The method of any of aspects 1 through 12, further comprising: providing, to the one or more wireless nodes of the radio access network, a sensing configuration, wherein the sensing configuration includes a sensing reference signal resource, an indication of beam management for one or more transmitters or receivers of the radio access network, a muting pattern for the one or more transmitters of the radio access network, a waveform configuration for transmissions by the one or more transmitters of the radio access network, or a combination thereof.

Aspect 14: A method for wireless communication at a first network entity of a core network, comprising: providing, to a second network entity of the core network different from the first network entity, a sensing query for one or more properties corresponding to each object of a plurality of objects; obtaining, from the second network entity of the core network and for each object of the plurality of objects, the one or more properties of the object; and determining, based at least in part on the one or more properties, mapping information for the plurality of objects.

Aspect 15: The method of aspect 14, further comprising: obtaining a mapping request from one or more applications associated with the first network entity, wherein the sensing query is provided based at least in part on the mapping request.

Aspect 16: The method of any of aspects 14 through 15, further comprising: providing, to a third network entity of the core network, the sensing query for forwarding to the second network entity from the third network entity; and obtaining, from the third network entity of the core network, the one or more properties of the object forwarded from the second network entity.

Aspect 17: The method of aspect 16, wherein the third network entity comprises an access management function of the core network.

Aspect 18: The method of any of aspects 14 through 17, wherein the first network entity comprises an application layer entity of the core network and the second network entity comprises a sensing management function of the core network.

Aspect 19: A method for wireless communication at a component of a radio access network, comprising; obtaining, from a network entity of a core network associated with the radio access network and for each object of a plurality of objects, a sensing query for radio frequency signal metrics associated with reflection off of each object of radio frequency signal transmissions associated with the radio access network; obtaining, from one or more wireless nodes of the radio access network, the radio frequency signal metrics; and providing, to the network entity, the radio frequency signal metrics Aspect 20: The method of aspect 19, further comprising: providing, to each of the one or more wireless nodes of the radio access network, a signal triggering radio frequency signal transmissions, wherein the radio frequency signal metrics are obtained based at least in part on the signal.

Aspect 21: The method of any of aspects 19 through 20, further comprising: obtaining, from a location management component of the radio access network, positioning information associated with the one or more wireless nodes, the object, or both; and providing the positioning information with the radio frequency signal metrics to the network entity.

Aspect 22: The method of any of aspects 19 through 21, wherein the component of the radio access network comprises a sensing management component of the radio access network.

Aspect 23: The method of any of aspects 19 through 22, wherein the component of the radio access network comprises a logical component implemented in wireless nodes of the radio access network.

Aspect 24: An apparatus for wireless communication at a first network entity of a core network, comprising a processor; memory coupled with the processor; and instructions stored in the memory and executable by the processor to cause the apparatus to perform a method of any of aspects 1 through 13.

Aspect 25: An apparatus for wireless communication at a first network entity of a core network, comprising at least one means for performing a method of any of aspects 1 through 13.

Aspect 26: A non-transitory computer-readable medium storing code for wireless communication at a first network entity of a core network, the code comprising instructions executable by a processor to perform a method of any of aspects 1 through 13.

Aspect 27: An apparatus for wireless communication at a first network entity of a core network, comprising a processor; memory coupled with the processor; and instructions stored in the memory and executable by the processor to cause the apparatus to perform a method of any of aspects 14 through 18.

Aspect 28: An apparatus for wireless communication at a first network entity of a core network, comprising at least one means for performing a method of any of aspects 14 through 18.

Aspect 29: A non-transitory computer-readable medium storing code for wireless communication at a first network entity of a core network, the code comprising instructions executable by a processor to perform a method of any of aspects 14 through 18.

Aspect 30: An apparatus for wireless communication at a component of a radio access network, comprising a processor; memory coupled with the processor; and instructions stored in the memory and executable by the processor to cause the apparatus to perform a method of any of aspects 19 through 23.

Aspect 31: An apparatus for wireless communication at a component of a radio access network, comprising at least one means for performing a method of any of aspects 19 through 23.

Aspect 32: A non-transitory computer-readable medium storing code for wireless communication at a component of a radio access network, the code comprising instructions executable by a processor to perform a method of any of aspects 19 through 23.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first network entity of a core network, comprising:
   at least one processor; and
   at least one memory coupled with the at least one processor, with instructions stored in the at least one memory, the instructions being executable by the at least one processor, individually or in any combination, to cause the apparatus to:
   obtain, from one or more wireless nodes of a radio access network associated with the core network, radio frequency signal metrics associated with reflection off of an object of radio frequency signal transmissions associated with the radio access network;
   obtain, from a location management function of the core network, positioning information associated with the one or more wireless nodes, the object, or both;
   determine, based at least in part on the radio frequency signal metrics and the positioning information, one or more properties of the object; and
   provide, to a second network entity of the core network that is different than the first network entity, an indication of the one or more properties of the object.

2. The apparatus of claim 1, wherein the instructions to obtain the positioning information are executable by the at least one processor, individually or in any combination, to cause the apparatus to:
   obtain the positioning information via an interface established between the first network entity and the location management function.

3. The apparatus of claim 1, wherein the first network entity and the location management function comprise a combined network entity of the core network.

4. The apparatus of claim 1, wherein the first network entity comprises a sensing management function of the core network, and the instructions are further executable by the at least one processor, individually or in any combination, to cause the apparatus to:
   obtain the radio frequency signal metrics from a sensing management component of the radio access network.

5. The apparatus of claim 4, wherein the sensing management component of the radio access network operates separately from the location management function of the core network to determine the one or more properties of the object.

6. The apparatus of claim 4, wherein the sensing management component of the radio access network comprises a combined radio access network component that is combined with the location management component of the radio access network.

7. The apparatus of claim 1, wherein the instructions are further executable by the at least one processor, individually or in any combination, to cause the apparatus to:
provide the indication of the one or more properties of the object to the second network entity via a third network entity of the core network that is different from the first network entity and the second network entity.

8. The apparatus of claim 7, wherein the third network entity comprises an access management function of the core network.

9. The apparatus of claim 1, wherein the instructions are further executable by the at least one processor, individually or in any combination, to cause the apparatus to:
obtain, from the second network entity of the core network, a sensing query for the one or more properties corresponding to each object of a plurality of objects, wherein the indication of the one or more properties is provided based at least in part on the sensing query.

10. The apparatus of claim 1, wherein the instructions are further executable by the at least one processor, individually or in any combination, to cause the apparatus to:
provide, to the one or more wireless nodes of the radio access network, a sensing configuration, wherein the sensing configuration includes a sensing reference signal resource, an indication of beam management for one or more transmitters or receivers of the radio access network, a muting pattern for the one or more transmitters of the radio access network, a waveform configuration for transmissions by the one or more transmitters of the radio access network, or a combination thereof.

11. The apparatus of claim 1, wherein the first network entity comprises a sensing management function of the core network that operates to determine the one or more properties of the object separately from the location management function of the core network.

12. The apparatus of claim 1, wherein the first network entity comprises a sensing management function of the core network and the second network entity comprises an application layer entity of the core network.

13. A method for wireless communication at a first network entity of a core network, comprising:
obtaining, from one or more wireless nodes of a radio access network associated with the core network, radio frequency signal metrics associated with reflection off of an object of radio frequency signal transmissions associated with the radio access network;
obtaining, from a location management function of the core network, positioning information associated with the one or more wireless nodes, the object, or both;
determining, based at least in part on the radio frequency signal metrics and the positioning information, one or more properties of the object; and
providing, to a second network entity of the core network that is different than the first network entity, an indication of the one or more properties of the object.

14. The method of claim 13, wherein obtaining the positioning information comprises:
obtaining the positioning information via an interface established between the first network entity and the location management function.

15. The method of claim 13, wherein the first network entity and the location management function comprise a combined network entity of the core network.

16. The method of claim 13, wherein the first network entity comprises a sensing management function of the core network, further comprising:
obtaining the radio frequency signal metrics from a sensing management component of the radio access network.

17. The method of claim 13, further comprising:
providing the indication of the one or more properties of the object to the second network entity via a third network entity of the core network that is different from the first network entity and the second network entity.

18. The method of claim 13, further comprising:
obtaining, from the second network entity of the core network, a sensing query for the one or more properties corresponding to each object of a plurality of objects, wherein the indication of the one or more properties is provided based at least in part on the sensing query.

19. A non-transitory computer-readable medium storing code for wireless communication, the code comprising instructions executable by at least one processor to:
obtain, from one or more wireless nodes of a radio access network associated with a core network, radio frequency signal metrics associated with reflection off of an object of radio frequency signal transmissions associated with the radio access network;
obtain, from a location management function of the core network, positioning information associated with the one or more wireless nodes, the object, or both;
determine, based at least in part on the radio frequency signal metrics and the positioning information, one or more properties of the object; and
provide, to a second network entity of the core network that is different than a first network entity, an indication of the one or more properties of the object.

20. The non-transitory computer-readable medium of claim 19, wherein the instructions to obtain the positioning information are executable by the at least one processor to:
obtain the positioning information via an interface established between the first network entity and the location management function.

21. The non-transitory computer-readable medium of claim 19, wherein the first network entity and the location management function comprise a combined network entity of the core network.

22. The non-transitory computer-readable medium of claim 19, wherein the first network entity comprises a sensing management function of the core network, and the instructions are further executable by the at least one processor to:
obtain the radio frequency signal metrics from a sensing management component of the radio access network.

23. The non-transitory computer-readable medium of claim 19, wherein the instructions are further executable by the at least one processor to:
provide the indication of the one or more properties of the object to the second network entity via a third network entity of the core network that is different from the first network entity and the second network entity.

24. The non-transitory computer-readable medium of claim 19, wherein the instructions are further executable by the at least one processor to:
obtain, from the second network entity of the core network, a sensing query for the one or more properties corresponding to each object of a plurality of objects, wherein the indication of the one or more properties is provided based at least in part on the sensing query.

25. An apparatus for wireless communication at a first network entity of a core network, comprising:
- means for obtaining, from one or more wireless nodes of a radio access network associated with the core network, radio frequency signal metrics associated with reflection off of an object of radio frequency signal transmissions associated with the radio access network;
- means for obtaining, from a location management function of the core network, positioning information associated with the one or more wireless nodes, the object, or both;
- means for determining, based at least in part on the radio frequency signal metrics and the positioning information, one or more properties of the object; and
- means for providing, to a second network entity of the core network that is different than the first network entity, an indication of the one or more properties of the object.

26. The apparatus of claim 25, wherein the means for obtaining positioning information comprises:
- means for obtaining the positioning information via an interface established between the first network entity and the location management function.

* * * * *